United States Patent
Wirola et al.

(10) Patent No.: US 9,967,853 B2
(45) Date of Patent: May 8, 2018

(54) USING INFORMATION ON NEIGHBOR CELLS OF OTHER NETWORK TYPES AND/OR OTHER OPERATORS FOR MOBILE TERMINAL POSITIONING

(71) Applicant: HERE Global B.V., Eindhoven (NL)

(72) Inventors: Lauri Aarne Johannes Wirola, Tampere (FI); Tommi Antero Laine, Tampere (FI); Laura Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 84 days.

(21) Appl. No.: 14/192,840

(22) Filed: Feb. 27, 2014

(65) Prior Publication Data
US 2014/0256348 A1    Sep. 11, 2014

(30) Foreign Application Priority Data

Mar. 6, 2013  (WO) ............... PCT/IB2013/051775
Aug. 12, 2013  (GB) ............................. 1314368.0

(51) Int. Cl.
*H04W 64/00* (2009.01)
*G01S 5/02* (2010.01)
(Continued)

(52) U.S. Cl.
CPC ............ *H04W 64/00* (2013.01); *G01S 5/02* (2013.01); *G01S 5/0236* (2013.01);
(Continued)

(58) Field of Classification Search
CPC ... H04W 64/00; H04W 64/006; H04W 48/16; H04W 36/0083; H04W 48/20;
(Continued)

(56) References Cited

U.S. PATENT DOCUMENTS 8,249,624 B2   8/2012  Wu
8,340,692 B2 * 12/2012  Skarby et al. ............ 455/456.5
(Continued)

FOREIGN PATENT DOCUMENTS

EP   2775744 A1   9/2014
GB   2511587 A    9/2014
(Continued)

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 11)", 3GPP TS 36.355, V11.3.0, Jun. 2013, pp. 1-118.
(Continued)

*Primary Examiner* — Olumide T Ajibade Akonai
(74) *Attorney, Agent, or Firm* — Alston & Bird LLP

(57) ABSTRACT

In accordance with an example embodiment of the present invention, a method performed by an apparatus comprises, causing said apparatus at least to perform one of providing and obtaining information on a serving cell that is, at a point of time, serving a mobile terminal and information related to a neighbor cell that is, at least substantially at said point of time, observed by said mobile terminal, wherein said serving cell is a cell of a first communication network, wherein said neighbor cell is a cell of a second communication network, and wherein said first communication network has a type that is different from a type of said second communication network and/or is operated by an operator that is different from an operator of said second communication network.

20 Claims, 7 Drawing Sheets

(51) Int. Cl.
*H04W 36/00* (2009.01)
*H04W 48/16* (2009.01)

(52) U.S. Cl.
CPC .... *H04W 36/0005* (2013.01); *H04W 36/0083* (2013.01); *H04W 48/16* (2013.01)

(58) Field of Classification Search
CPC ...... H04W 8/18; G01S 5/0009; G01S 5/0018; G01S 5/0036; G01S 5/0045; G01S 5/0063; G01S 5/0205; G01S 5/021; G01S 5/0221; G01S 5/0236; G01S 5/0252; G01S 5/02; G01S 5/0257; G01S 5/0263; H04B 17/0072; H04B 17/27
See application file for complete search history.

(56) References Cited

U.S. PATENT DOCUMENTS

| | | | |
|---|---|---|---|
| 2003/0064735 A1* | 4/2003 | Spain et al. | 455/456 |
| 2004/0106413 A1* | 6/2004 | Sambin | 455/456.1 |
| 2005/0037775 A1* | 2/2005 | Moeglein | G01S 5/0036 455/456.1 |
| 2006/0167628 A1 | 7/2006 | Karaoguz et al. | |
| 2006/0286961 A1 | 12/2006 | Levitan | |
| 2008/0274753 A1 | 11/2008 | Attar et al. | |
| 2010/0137005 A1* | 6/2010 | Zeng et al. | 455/456.6 |
| 2010/0323688 A1 | 12/2010 | Kazmi et al. | |
| 2011/0081918 A1 | 4/2011 | Burdo et al. | |
| 2011/0269477 A1* | 11/2011 | Annamalai et al. | 455/456.1 |
| 2011/0319076 A1* | 12/2011 | Ramasamy | H04W 48/16 455/434 |
| 2012/0184290 A1 | 7/2012 | Kazmi et al. | |
| 2012/0258729 A1 | 10/2012 | Siomina et al. | |
| 2012/0327797 A1 | 12/2012 | Siomina et al. | |
| 2012/0329479 A1 | 12/2012 | Wirola et al. | |
| 2013/0203410 A1* | 8/2013 | Gandhi | H04W 48/16 455/434 |

FOREIGN PATENT DOCUMENTS

| | | |
|---|---|---|
| WO | WO 99/57932 A2 * | 11/1999 |
| WO | 2002/082850 A1 | 10/2002 |
| WO | 2010/072240 A1 | 7/2010 |
| WO | 2011/099909 A1 | 8/2011 |
| WO | 2011/110899 A1 | 9/2011 |
| WO | 2013/136123 A1 | 9/2013 |
| WO | 2013/136124 A1 | 9/2013 |
| WO | 2013/136128 A1 | 9/2013 |
| WO | WO 2014/135921 A1 | 9/2014 |

OTHER PUBLICATIONS

"LPP Extensions Specification", Open Mobile Alliance, Candidate Version 1.0, Mar. 19, 2013, pp. 1-280.

Lakhzouri et al., "Constrained Deconvolution Approach with Intercell Interference Cancellation for LOS Estimation in WCDMA System", IEEE International Conference on Communications, vol. 5, Jun. 20-24, 2004, 5 pages.

Search Report received for corresponding United Kingdom Patent Application No. 1314368.0, dated Jan. 21, 2014, 3 pages.

Extended European Search Report received for corresponding European Patent Application No. 14155120.0, dated Mar. 18, 2014, 6 pages.

International Search Report and Written Opinion received for corresponding Patent Cooperation Treaty Application No. PCT/IB2013/051775, dated Nov. 15, 2013, 8 pages.

European Patent Office, Communication pursuant to Article 94(3) EPC for Application No. 14155120.0, dated Oct. 24, 2017, 6 pages, Netherlands.

* cited by examiner

USING INFORMATION ON NEIGHBOR CELLS OF OTHER NETWORK TYPES AND/OR OTHER OPERATORS FOR MOBILE TERMINAL POSITIONING

FIELD OF THE DISCLOSURE

The invention relates to the field of positioning of mobile terminals, and more specifically to positioning of mobile terminals that is based on positioning-related information of cells of communication networks.

BACKGROUND

Modern global cellular and non-cellular positioning technologies are based on generating large global databases containing information on cellular and non-cellular signals. The information may originate entirely or partially from users of these positioning technologies acting as data collectors.

The data provided by these data collectors is typically in the form of "fingerprints", which contain a position that is estimated based on, e.g., received satellite signals of a global navigation satellite system (GNSS) and measurements taken from one or more radio interfaces for signals of a cellular and/or non-cellular radio network. In the case of measurements on cellular signals, the results of the measurements may contain a global and/or local identification of the cellular network cells observed, their signal strengths and/or pathlosses and/or timing measurements like timing advance (TA) or round-trip time (RTT). For measurements on wireless local area network (WLAN) signals, as an example of signals of a non-cellular network, the results of the measurements may contain a basic service set identification (BSSID), like the medium access control (MAC) address of observed access points, and/or the service set identifier (SSID) of the access points, and/or the signal strength of received signals (received signal strength indication RSSI or physical Rx level in dBm with a reference value of 1 mW, etc.), and/or pathloss estimates and/or timing measurements (like e.g. RTT).

This data may then be transferred to a server or cloud, where the data (usually of a multitude of users) may be collected and where positioning-related information may be generated (or updated) based on the data. Such positioning-related information for instance comprise estimates for respective coverage areas (coverage area estimates) and/or radio channel models for communication network cells or nodes. Positioning-related information may for instance serve as a "radiomap".

In the end, this positioning-related information may be used for estimating the position of mobile terminals. This may function in two modes. The first mode is the terminal-assisted mode, in which the mobile terminal performs the measurements of the cellular and/or non-cellular air interface, provides the measurements (e.g. at least an identification of the cells observed) to the remote server, which in turn, based on the positioning-related information and the measurements, determines and provides the position estimate back to the mobile terminal. The second mode is the terminal-based mode, in which the mobile terminal has a local copy of the positioning-related information (or only a subset thereof, e.g. a regionally restricted subset thereof). This subset copy is downloaded by the mobile terminal from a remote server for the area of interest (e.g. a small area around the current location, for a whole country, or so). This subset copy can of course be pre-installed to the mobile terminal in the factory, but even in that case the data needs to be refreshed at some point.

SUMMARY OF SOME EXAMPLE EMBODIMENTS OF THE INVENTION

It is possible to use not only the positioning-related information of serving cells of a cellular communication network for positioning purposes, but to use the positioning-related information of serving and neighbor (non-serving) cells of the same cellular communication network for positioning. However, the potential of exploiting positioning-related information of neighbor cells in general has not fully been exploited so far.

Embodiments of the present invention pertain to a method, apparatus, computer program or computer program product for providing or obtaining
    information on a serving cell that is, at a point of time, serving a mobile terminal and
    information related to a neighbor cell that is, at least substantially at the point of time, observed by the mobile terminal
wherein the serving cell is a cell of a first communication network, wherein the neighbor cell is a cell of a second communication network, and wherein the first communication network has a type that is different from a type of the second communication network and/or is operated by an operator that is different from an operator of the second communication network.

Embodiments of the present invention also pertain to a method, apparatus, computer program or computer program product for storing, providing or obtaining
    positioning-related information for a serving cell that is capable of serving a mobile terminal when the mobile terminal is positioned at a first position, and
    positioning-related information for a neighbor cell that is observable by the mobile terminal when the mobile terminal is positioned at the first position and served by the serving cell,
wherein the serving cell is a cell of a first communication network, wherein the neighbor cell is a cell of a second communication network, and wherein the first communication network has a type that is different from a type of the second communication network and/or is operated by an operator that is different from an operator of the second communication network.

According to embodiments of the present invention, thus not only a serving cell of a first communication network, but also a neighbor (non-serving) cell of a second communication network that is of a different type and/or is operated by a different operator is taken into consideration for fingerprint collection, generation of positioning-related information and terminal-based or terminal-assisted positioning. For example, while considering a serving cell of a Wideband Code Division Multiple Access (WCDMA) network and possibly also one or more neighbor cells of the WCDMA network, furthermore at least one neighbor cell of a Global System for Mobile Communications (GSM) network is considered. Optionally, for instance furthermore one or more neighbor cells of a WCDMA network of a different operator may be considered as well. Considering neighbor cells also of other-type networks or networks of other operators significantly increases positioning accuracy, since positioning-related information of more cells is available and contributes to confine the position estimate to a smaller area. In particular for the case where both the first and second communication network are operated by the same operator, but are of different type (e.g. WCDMA and GSM), the measurements performed by the mobile terminal for providing fingerprints or for serving as a basis for positioning may be performed by the mobile terminal anyway in order to assess the necessity of an inter-network handover, so that no additional hardware is required for this measurement, and also the (battery) power budget is not affected. In this case, measurements on neighbor cells may be confined to the neighbor cells on a list of neighbor cells associated with the serving cell, e.g. as provided by the operator. Thus instead of measuring all neighbor cells that can be observed, only a limited subset thereof is measured, which reduces both the amount of potentially superfluous data generated (measured cell information is only valuable if according positioning-related information for this cell is available) and the battery power required for the measurements. Similarly, even in the case where the first and second communication network are operated by different operators, the mobile terminal may be provided with a list of neighbor cells of the second communication network, wherein this list is associated with a serving cell of the first communication network. This list may not be used in the context of inter-network handover, since different operators would be involved, but may be specifically provided for positioning purposes to reduce the number of neighbor cells to be measured by the mobile terminal.

It is to be understood that the presentation of embodiments of the invention in this section is merely exemplary and non-limiting. Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 1A:
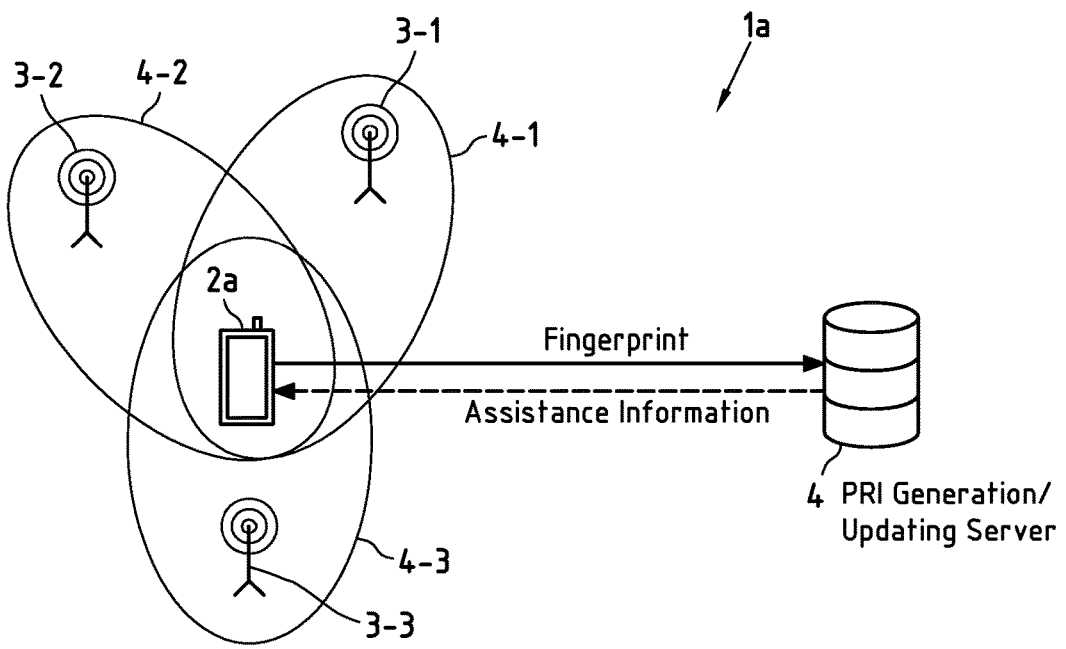
FIGS. 1a-1c are schematic illustrations of positioning systems in which example embodiments of apparatuses according to the present invention are deployed.

FIG. 1a shows a positioning system 1a, in which example embodiments of apparatuses according to the present invention can be deployed. In FIG. 1a, mobile terminal 2a is capable of identifying one or more serving cells of one or more communication networks and observing one or more neighbor cells of one or more communication networks, as will be further described below. This observing may comprise at least locally identifying the neighbor cells.

The (serving and neighbor) cells are characterized by a set of one or more physical resources assigned for use in this cell by a network operator. Non-limiting examples of resources are frequency channels, timeslots, spreading codes, scrambling codes, spatial channels (e.g. antenna beams, space-time codes or eigenmodes) and polarization channels. The cells are associated with nodes (e.g. base stations or base transceiver stations) of one or more communication networks, of which nodes 3-1, 3-2 and 3-3 are exemplarily shown in FIG. 1a. This association is not necessarily a one-to-one relationship, since a single node may be associated with plural cells. For instance, a single base station may be associated with a plurality of cells that only differ in the orthogonal resources used by them (e.g. spreading codes or frequencies).

Each of nodes 3-1, 3-2 and 3-3 provides radio coverage in a respective coverage area 4-1, 4-2 and 4-3.

In this respect, thus each cell is, via the node associated with the cell, also associated with a coverage area. Similarly, each cell can be associated with a radio channel model.

In the positioning system 1a of FIG. 1a, mobile terminal 2a is a collector terminal that is equipped with a receiver of a Global Navigation Satellite System (GNSS) and is capable of determining an estimate of its position (alternatively, of course, other means for estimating a position may be deployed by collector terminal 2a). This position estimate (e.g. a GNSS based position measurement), together with information on one or more serving cells and one or more neighbor cells that can be observed at this estimated position, is provided as a so-called "fingerprint" to Position-Related Information (PRI) generation/updating server 4. This may happen in regular intervals, or upon request, to name but a few examples. Therein, a serving cell is understood as the cell with which the mobile terminal 2a is currently associated when communicating in a cellular communication network, and/or with which it would be associated when starting to communicate in the cellular network. A serving cell may for instance be the cell (e.g. of one or more cellular communication networks in which the mobile terminal 2a is capable and/or entitled to communicate) associated with the node from which the mobile terminal 2a receives signals with the highest signal strength as compared to the signals received from nodes associated with other cells of the one or more cellular communication networks. In case of a mobile terminal 2a with two Subscriber Identity Module (SIM) cards, the mobile terminal 2a may even be associated with two different serving cells at the same time. Server 4, based on fingerprints received from a plurality of collector terminals like mobile terminal 2a, generates and/or updates PRI for the cells of one or more communication networks. This generation and/or updating may of course be based on other information sources as well, such as for instance network planning information from the operator(s) of the communication networks. Examples of PRI are for instance coverage area models, radio channel models, node positions, Rx fields etc. Server 4 may for instance generate a coverage area model for a cell by defining an ellipse or other geometric form that comprises the position estimates of all fingerprints in which observance of this cell was reported by a collector terminal.

Figure 1B:
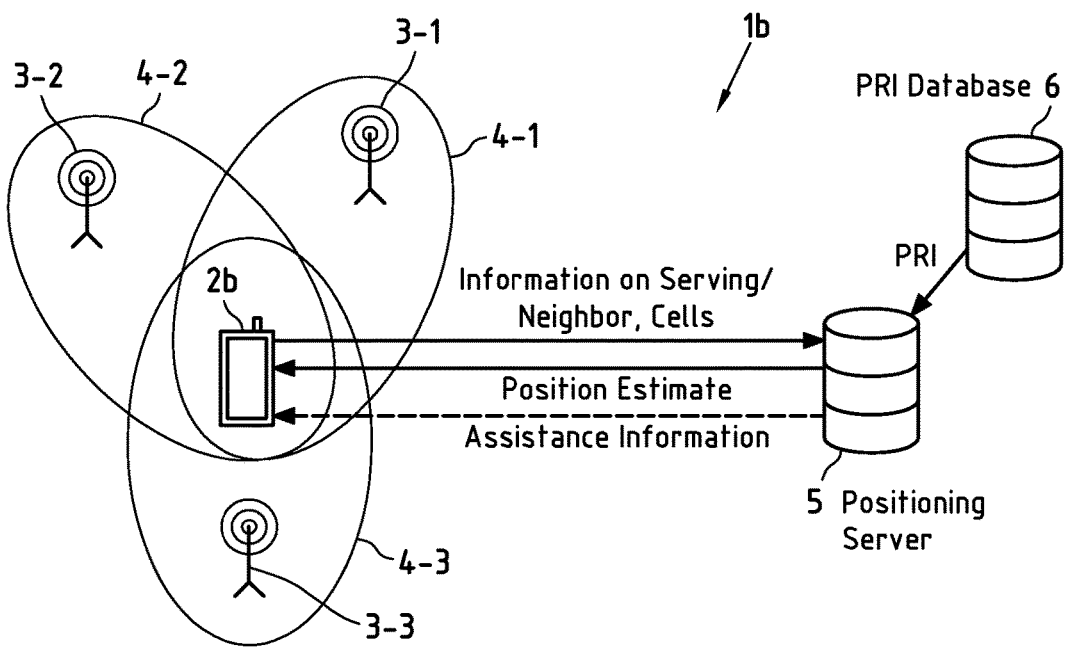

In the positioning system 1b of FIG. 1b, such PRI is stored in PRI database 6 and is used by positioning server 5, which has access to PRI database 6 or incorporates PRI database 6, to determine a position estimate for mobile terminal 2b. To obtain a position estimate from positioning server 5, mobile terminal 2b provides information on a serving cell and on one or more neighbor (non-serving) cells that are observable at the position of mobile terminal 2b. Positioning server 5, in response to the received information on the serving cell (or possibly two serving cells in case of a dual-SIM mobile terminal) and the one or more neighbor cells, retrieves the according PRI for these cells and uses this PRI to determine a position estimate for mobile terminal 2b, which position estimate is then provided to mobile terminal 2a. Optionally, as indicated in dashed lines in FIG. 1b, positioning server 5 may also provide assistance information to mobile terminal 2b, which assistance information can be used by mobile terminal 2b in the positioning process. For instance, the assistance information may comprise a list of neighbor cells on which information should be provided to positioning server 5 by mobile terminal 2b, as will be further explained below.

Figure 1C:
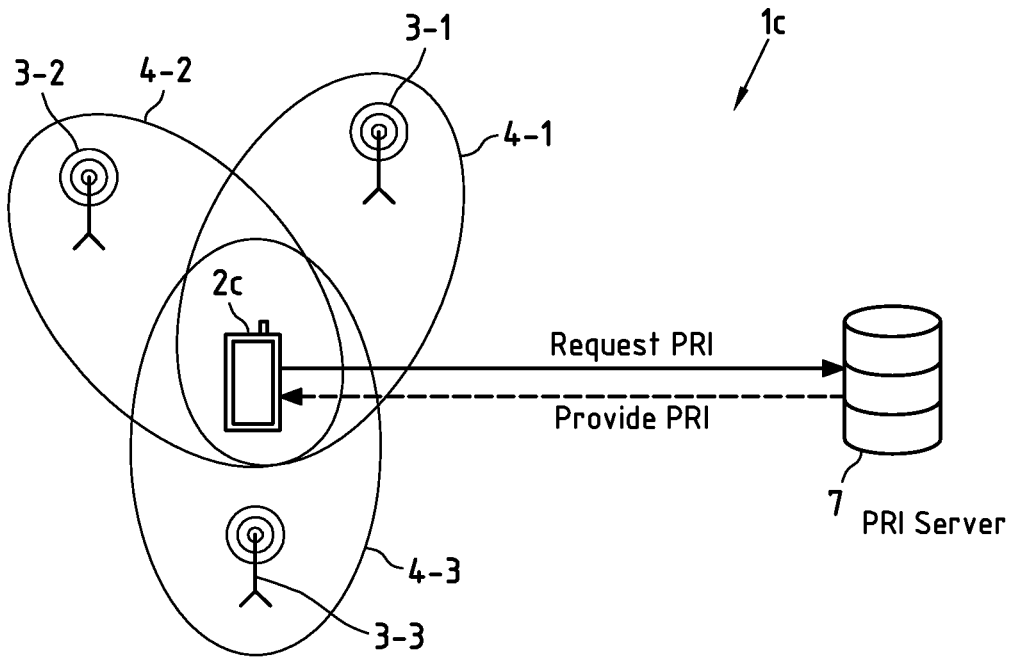

FIG. 1c shows a further positioning system 1c, where position estimates for mobile terminal 2c are determined by mobile terminal 2c itself. To this end, mobile terminal 2c has either pre-stored PRI or obtains PRI, for instance for specified cells or groups of cells, upon request from PRI server 7. PRI server 7 may for instance incorporate an according PRI database. Mobile terminal 2c may for instance specific for which geographic region and/or for which network operator PRI is required, and may be provided with this PRI accordingly. The requested PRI may also depend on the technical capabilities of mobile terminal 2c. For instance, if the mobile terminal 2c is capable of determining path losses, according radio channel model information may be included in the PRI since it can be exploited by mobile terminal 2c. The process of actually determining a position estimate then takes place as described for positioning server 5 in the context of FIG. 1b before, only that now the determining is performed locally on mobile terminal 2c based on information on the serving cell(s) and the one or more neighbor cells that mobile terminal 2c is able to observe and the according PRI for these cells.

In the above systems 1a-1c, non-limiting examples of nodes of communication networks (also denoted as communication network nodes herein) are base stations or base transceiver stations (or sectors thereof) of one or more cellular communication networks, such as for instance second generation (2G, for instance the Global System for Mobile Communication (GSM) and its derivatives, such as the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, or CDMA-2000) or fourth generation (4G, for instance the Long Term Evolution, LTE, system, the LTE Advanced (LTE-A) system or the IEEE 802.16m WiMAX system) communication networks. Said communication networks can support speech and data, or speech only, or data only. For instance, data coverage provided by a wireless hotspot using a cellular connection, such as for instance an ad-hoc WLAN hotspot formed by tethering with a cellular phone, or a MiFi hotspot, is considered as a cell, in particular a "data cell", of a communication network. The serving cell and/or one or more of the neighbor cells may be such "data cells".

A cellular communication network may for instance be characterized by a basically seamless pavement of a geographical area (usually in the order of at least hundreds or thousands of square kilometers) with cells in which coverage is provided by communication network nodes that are operated by the same operator, which network may for instance support communication handover between cells.

Non-limiting examples of a mobile terminal are a cellular phone (e.g. a smartphone), a personal digital assistant, a laptop computer, a tablet computer, a navigation device (which may be portable by a human user or be installed in a vehicle, for example) or a multimedia player. Each of these devices is capable of wirelessly communicating at least in one cellular communication network.

A coverage area generally depends on a plurality of parameters of both the communication network node that provides the coverage area (inter alia antenna beamwidth and positioning, transmission power) and the propagation environment (inter alia pathloss and shadowing caused by obstructing elements).

A model of a coverage area (also denoted as coverage area model in the following) may for instance be or at least be desired to be representative of a coverage area. However, at least temporary deviations may occur between the model and the actual coverage area, for instance in case of changes or movement of the coverage area. A model for a coverage area may for instance be a model representing hard boundaries of a coverage area, or a model that represents a coverage area in a statistical sense, for instance by means of a probability (density) function. An example of such a statistical representation of a coverage model is a multi-normal distribution. A coverage area model may only be a coarse model of a coverage area, e.g. an elliptical or polygonal model. The coverage area model may equally well be constituted by a set of grids of a grid of regions, e.g. a rectangular grid of regions. In a simple exemplary case, a coverage area model may be represented by a position of the coverage providing node and information on the reach of this coverage providing node.

As an alternative or addition to coverage area models, also radio channel models (aka radio propagation models) for cells (or for the communication network nodes associated with the cells) may serve as a basis for determining a position of a mobile terminal, if a mobile terminal is able to measure a received signal strength and/or a path loss. A radio channel model thus constitutes another example of PRI for a cell.

A radio channel model may for instance describe how the power of a signal emitted by a communication network node associated with a cell decays with increasing distance from the communication network, for instance under consideration of further parameters as for instance the radio transmission frequency. To this end, the radio channel model may for instance take into account effects of free space propagation, slow fading and fast fading, to name but a few examples. The radio channel model may for instance be parameterized by and/or characterized by one or more parameters, such as for instance a path loss exponent, as it is known to a person skilled in the art. A non-limiting example for a radio channel model is the Okumura/Hata model, which predicts the path loss $L_P$ in dB as follows:

$$\frac{L_P}{dB} = 69.55 + 26.16\log\left(\frac{f}{MHz}\right) - 13.82\log\left(\frac{h_T}{m}\right) - a(h_R) + \left(44.9 - 6.55\log\left(\frac{h_T}{m}\right)\right)\log\left(\frac{d}{km}\right),$$

wherein f denotes the radio transmission frequency, $h_T$ is the transmit antenna height, $h_R$ is the receive antenna height, $a(h_R)$ is a correction factor for the height of the receiving antenna (which is for instance approximately zero for $h_R$=1.5 m) and d is the distance between transmit and receive antenna.

Now, if radio channel model information (for instance comprising an identifier of the radio channel model to be used, for instance in case that more than one radio channel model is in use, and/or one or more of the parameters characterizing the radio channel model, so that the radio channel model for instance indicates the pathloss as a function of the distance between the transmitting node associated with the cell and the mobile terminal) is available for an observed cell, and if a strength of a signal from this communication network node as received at the mobile terminal (or the path loss experienced by this signal) has been measured at the mobile terminal, an estimate of the distance towards the communication network node can be determined and exploited (e.g. among further information) to determine a position estimate for the mobile terminal. This may additionally require knowledge of the transmission power level of the signal as used by the communication network node, which may for instance be pre-defined, included into the radio channel model or signaled to the mobile terminal, to name but a few examples. For instance, consider the exemplary case where the mobile terminal observes three cells respectively associated with three communication network nodes with associated coverage area models and radio channel models. Based on the coverage area models only, which are exemplarily considered to be elliptical, the position estimate for the mobile terminal would be obtained as the intersection of three ellipses (as schematically shown in FIG. 1). By further considering the radio channel models associated with the observed cells and measured received signal strengths at the mobile terminal with respect to each of the communication network nodes of these cells, the position estimate for the mobile terminal can be further narrowed down by considering the distances from the mobile terminal to the three communication network nodes, ideally yielding an intersection of three arcs (the radius of each given by the respective distance from the mobile terminal to the respective communication network node, the position of which is for instance contained in the elliptical coverage area models) somewhere within the intersection of the three ellipses.

Receiving signals or information from the node associated with the cell may for instance require that the mobile terminal is technically capable to receive such signals or information. Thus a mobile terminal may have to support the transmission technology (e.g. the communication standard) used by the node associated with the cell. Receiving signals or information from the node associated with the cell may also require that the mobile terminal is entitled to communicate with or at least receive signals or information from the node.

Observing a cell (e.g. a neighbor cell) of a communication network by a mobile terminal may for instance require that the mobile terminal is able to receive one or more signals (e.g. a broadcast channel), which are sent by the node associated with the cell with a pre-defined minimum quality (for instance defined in terms of a signal-to-noise ratio or a signal-to-noise and interference ratio), and/or is able to at least partially receive and correctly decode one or more signals sent by the node associated with the cell, and/or is able to receive and correctly decode an identifier of the cell (e.g. a Base Station Identity Code (BSIC)). Some or all of these conditions for observing a cell may for instance be met when the mobile terminal is within the coverage area of the communication network node associated with the cell.

Therein, a cell may for instance have an identifier that is unique (e.g. globally unique) at least in the communication network (and for instance also in all other communication networks). Equally well, a cell may for instance have an identifier that is not globally unique (e.g. only locally unique) in the communication network, but that is at least unique in a sub-region of the region covered by the communication network.

An example of a globally unique identifier is the Global Cell Identity (GCI), which is based on the Country Code-Network Code-Cell ID hierarchy in 3GPP networks (SID-NID-BSID in CDMA/CDMA2000 networks). The cell may be uniquely identified on a global basis with its GCI. Identifying a cell (e.g. a serving cell) in a globally unique sense may, in addition to the above-described requirements for observing a cell, further require that a system information element containing information on the GCI for these cells is decoded.

An example of an only locally unique identifier is the Local Cell Identity (LCI), which is related to the physical resources allocated for the cell. For example, in the case of GSM and its derivatives the physical resources are associated with the cell tower (BISC) and the frequency (ARFCN). The physical resources are re-used in the network, i.e. the same BSIC/ARFCN combination repeats in the network. Thus the LCI can be identified with the corresponding GCI only, when there is additional information on the location, i.e. the mapping LCI→GCI is only locally injective whereas GCI→LCI mapping is globally injective. The following table summarizes the GCIs and LCIs across the commonly used communication networks with different air interface types.

| Network | Global Cell ID | Local Cell ID |
| --- | --- | --- |
| GSM | PLMN + 16-bit LAC + 16-bit Cell ID | BSIC (range 0-63) + ARFCN (range 0-1023) |
| WCDMA | PLMN + 28-bit UCID | UARFCN-DL (range 0-16383) + P-CPICH range (0-511) |
| TD-SCDMA | PLMN + 28-bit UCID | UARFCN-Nt (range 0-16383) + Cell Parameters ID (range 0-127) |
| LTE | PLMN + 28-bit Cell ID | EARFCN (range 0-65535) + Physical Cell Identifier (range 0-503) |
| CDMA | System ID (15 bits) + Network ID (16 bit) + BS-ID (16 bits) | PN offset (range 0-511) + Band class (range 0-31) + CDMA frequency (range 0-2047) |

Therein, the following abbreviations have been used in the above table:
WCDMA=Wide-Band CDMA
CDMA=Code Division Multiple Access
TD-SCDMA=Time Division Synchronous CDMA
LTE=Long Term Evolution
PLMN=Public Land Mobile Network (MCC+MNC)
MCC=Mobile Country Code
MNC=Mobile Network Code
BSIC=Base Station Identity Code
ARFCN=Absolute Radio Frequency Channel
UARFCN=UTRAN ARFCN UTRAN=UMTS Terrestrial RAN
RAN=Radio Access Network
P-CPICH=Primary Control Pilot Channel
EARFCN=Evolved ARFCN
UCID=UTRA Cell ID In the following, different aspects of the present invention will be disclosed based on and with reference to the above description.

An example embodiment of a method according to a first aspect of the present invention is performed by an apparatus and comprises providing
- information on a serving cell that is, at a point of time, serving a mobile terminal and
- information related to a neighbor cell that is, at least substantially at the point of time, observed by the mobile terminal, wherein the serving cell is a cell of a first communication network, wherein the neighbor cell is a cell of a second communication network, and wherein the first communication network has a type that is different from a type of the second communication network and/or is operated by an operator that is different from an operator of the second communication network.

Figure 2:
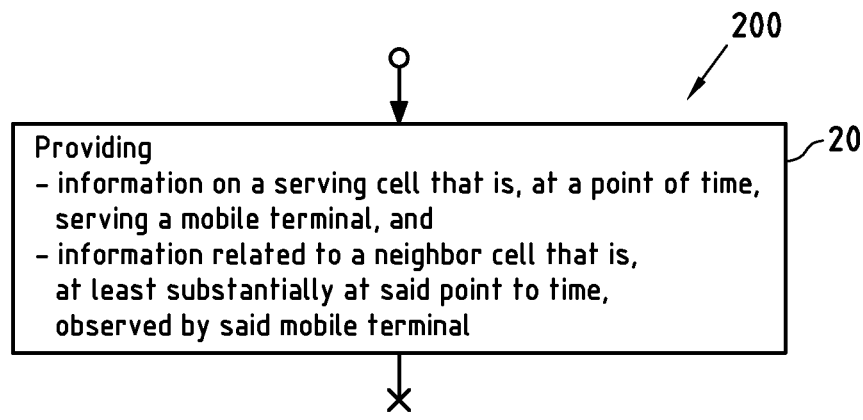
FIGS. 2-6 are flowcharts of example embodiments of methods according to the present invention.

This example embodiment of a method according to the first aspect of the present invention is illustrated by step 201 of flowchart 200 of FIG. 2 and may for instance be performed by mobile terminal 2a of FIG. 1a or by mobile terminal 2b of FIG. 1b.

An example embodiment of a method according to a second aspect of the present invention is performed by an apparatus and comprises obtaining
- information on a serving cell that is, at a point of time, serving a mobile terminal and
- information related to a neighbor cell that is, at least substantially at the point of time, observed by the mobile terminal, wherein the serving cell is a cell of a first communication network, wherein the neighbor cell is a cell of a second communication network, and wherein the first communication network has a type that is different from a type of the second communication network and/or is operated by an operator that is different from an operator of the second communication network.

Figure 3:
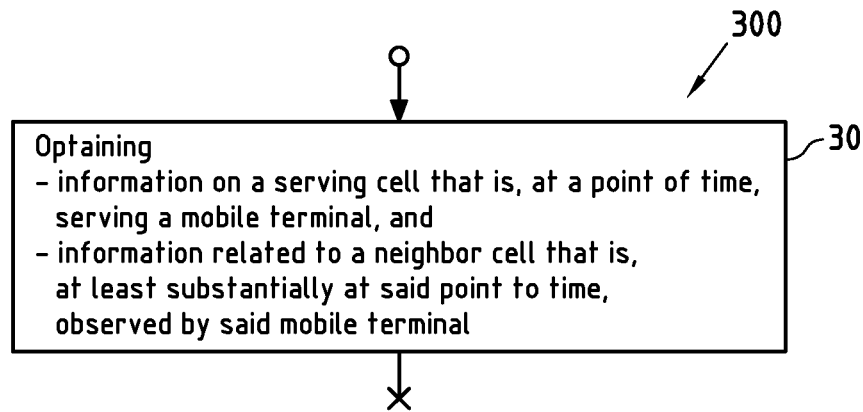

This example embodiment of a method according to the second aspect of the present invention is illustrated by step 301 of flowchart 300 of FIG. 3 and may for instance be performed by PRI generation/updating server 4 of FIG. 1a or by positioning server 5 of FIG. 1b.

An example embodiment of a method according to a third aspect of the present invention is performed by an apparatus and comprises storing
- PRI for a serving cell that is capable of serving a mobile terminal when the mobile terminal is positioned at a first position, and
- PRI for a neighbor cell that is observable by the mobile terminal when the mobile terminal is positioned at the first position and served by the serving cell, wherein the serving cell is a cell of a first communication network, wherein the neighbor cell is a cell of a second communication network, and wherein the first communication network has a type that is different from a type of the second communication network and/or is operated by an operator that is different from an operator of the second communication network.

Figure 4:
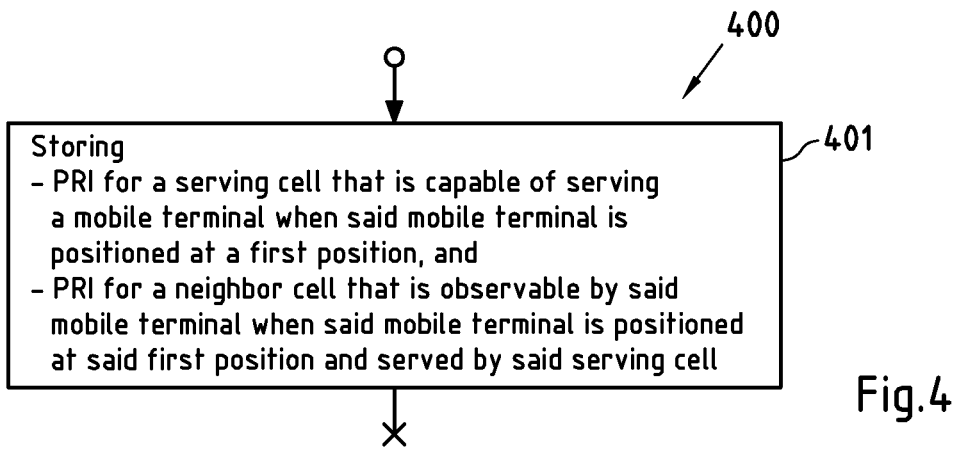

This example embodiment of a method according to the third aspect of the present invention is illustrated by step 401 of flowchart 400 of FIG. 4 and may for instance be performed by PRI database 6 of FIG. 1b, mobile terminal 2c of FIG. 1c or PRI server 7 of FIG. 1c.

An example embodiment of a method according to a fourth aspect of the present invention is performed by an apparatus and comprises providing
- PRI for a serving cell that is capable of serving a mobile terminal when the mobile terminal is positioned at a first position, and
- PRI for a neighbor cell that is observable by the mobile terminal when the mobile terminal is positioned at the first position and served by the serving cell, wherein the serving cell is a cell of a first communication network, wherein the neighbor cell is a cell of a second communication network, and wherein the first communication network has a type that is different from a type of the second communication network and/or is operated by an operator that is different from an operator of the second communication network.

Figure 5:
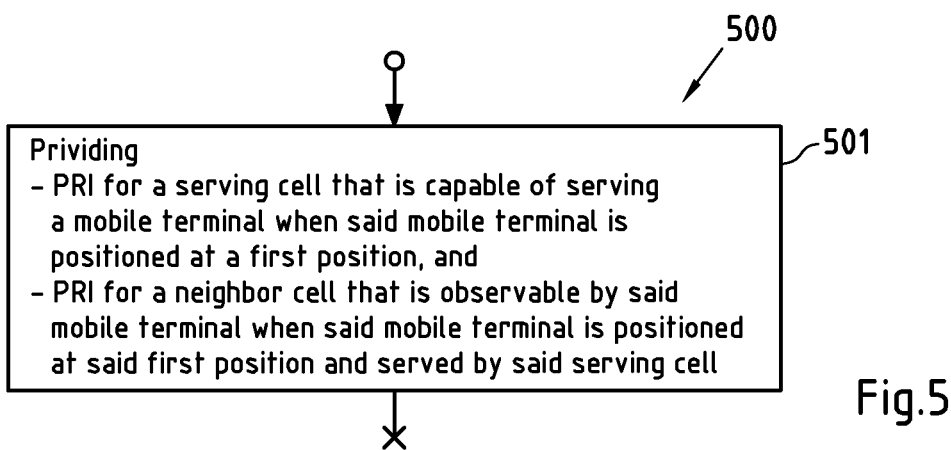

This example embodiment of a method according to the fourth aspect of the present invention is illustrated by step 501 of flowchart 500 of FIG. 5 and may for instance be performed by PRI database 6 of FIG. 1b or PRI server 7 of FIG. 1c.

An example embodiment of a method according to a fifth aspect of the present invention is performed by an apparatus and comprises obtaining
- PRI for a serving cell that is capable of serving a mobile terminal when the mobile terminal is positioned at a first position, and
- PRI for a neighbor cell that is observable by the mobile terminal when the mobile terminal is positioned at the first position and served by the serving cell, wherein the serving cell is a cell of a first communication network, wherein the neighbor cell is a cell of a second communication network, and wherein the first communication network has a type that is different from a type of the second communication network and/or is operated by an operator that is different from an operator of the second communication network.

Figure 6:
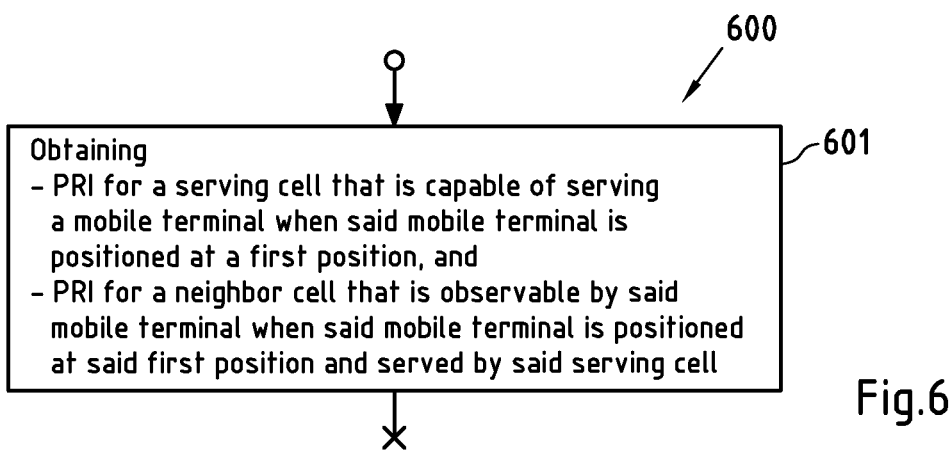

This example embodiment of a method according to the fifth aspect of the present invention is illustrated by step 601 of flowchart 600 of FIG. 6 and may for instance be performed by positioning server 5 FIG. 1b or mobile terminal 2c of FIG. 1c.

According to all of these five aspects, the first and second communication networks may for instance be cellular communication networks (which may support speech and data, speech only, or data only as already explained above). The first communication network has a type that is different from a type of the second communication network and/or is operated by an operator that is different from an operator of the second communication network. Thus the following three cases may occur:
- the first and second communication networks have different types, but are operated by the same operator
- the first and second communication networks have the same type, but are operated by different operators
- the first and second communication networks have different types and are operated by different operators.

According to all of these five aspects, the PRI for the serving cell and the PRI for the neighbor cell are stored in a database (e.g. PRI database 6 of FIG. 1b or PRI server 7 of FIG. 1c), and wherein the database reflects a dependency of the neighbor cell from the serving cell so that to retrieve the position-related information for the neighbor cell, at least the information on the serving cell and the information related to the neighbor cell is required. The neighbor cell may for instance be treated as a child or subordinated element of the serving cell.

According to all of these five aspects, the PRI comprises at least one of a coverage area model, a position of a node providing coverage, a radio propagation model and a reception field.

According to all of these five aspects, the information on the serving cell comprises a cell identifier of the serving cell that is a globally unique cell identifier. The globally unique cell identifier may for instance be one of the Global Cell IDs listed in the table above. The information on the serving cell may comprise further information, such as measurement information. Non-limiting examples of such further information are information on used frequencies or spreading codes, or on received signal strengths, signal-to-noise ratios or pathlosses.

According to all of these five aspects, the information related to the neighbor cell constitutes a cell identifier that is not a globally unique cell identifier. The non-globally unique cell identifier may for instance be a locally unique identifier as described above, for example one of the Local Cell IDs listed in the table above. Although this identifier is not globally unique, it may nevertheless be exploited for positioning purposes if it is stored in a dependency relationship with respect to a globally unique cell, e.g. as a child of a globally unique cell such as for instance a serving cell. The information related to the neighbor cell may comprise further information, such as measurement information. Non-limiting examples of such further information are information on received signal strengths, signal-to-noise ratios or pathlosses.

The information related to the neighbor cell may for instance comprise information on one or more physical resources of the neighbor cell. The physical resources ma for instance comprise one or more of frequency channels, timeslots, spreading codes, scrambling codes, spatial channels and polarization channels. For example, if the second communication network is a WCDMA network, the physical resources may for instance comprise a UARFCN-DL and a P-CPICH, as indicated by the table above. If the second communication network is a GSM network or a derivative thereof, the physical resources may for instance comprise a BSIC and an ARFCN.

According to all of these five aspects, the neighbor cell is considered to be different from the serving cell. Furthermore, the term "neighbor" should only be understood to express the characteristic of a neighbor cell to be observable when a mobile terminal is currently served by a serving cell. The term "neighbor" should in particular not be construed in any narrower sense, i.e. to require that the neighbor cell and the serving cell are in a direct spatial neighborhood relationship or the like.

According to all of these five aspects, the type of the first communication network is an air interface type. Examples of communication networks of different air interface types are given in the table above. Different air interface types may for instance be defined by different standards known to a person skilled in the art, for instance from standard-setting organizations as the Third Generation Partnership Project (3GPP) or the International Telecommunications Unions (ITU), to name but a few examples. An air interface type may for instance be detected based on the use of parameters that are specific for this air interface type, such as for instance an ARFCN and a BSIC in case of a GSM network or a derivative thereof, a UARFCN-DL and a PCPICH in case of a WCDMA network, a UARFCN-Nt and a Cell Parameters ID in case of a TD-SCDMA network, a EARFCN and a Physical Cell Identifier in case of an LTE network and a PN offset, a Band class and a CDMA frequency in case of a CDMA network.

According to all of these five aspects, the first communication network may for instance be one of a GSM network or a derivate thereof (e.g. a GPRS, EDGE or HSCSD network), a WCDMA network, a TD-SCDMA network, an LTE network or a CDMA network, and the second communication network is one of a GSM network or a derivate thereof (e.g. a GPRS, EDGE or HSCSD network), a WCDMA network, a TD-SCDMA network, an LTE network or a CDMA network (e.g. a CDMA2000 network). Therein, the GSM network or its derivatives may be understood as 2G networks. The WCDMA and TD-SCDMA networks may for instance be considered as representatives of the 3G UTRA-FDD and UTRA-TDD air interfaces, respectively). An LTE network may be understood as a representative of a 4G network.

According to all of these five aspects, an operator of a communication network may for instance be a commercial company providing mobile telecommunications services to (prepaid and/or postpaid) customers. To this end, an operator may deploy the communication network infrastructure (e.g. communication network nodes and a backbone network connected to these communication network nodes) in a geographical region in which these services shall be provided. Different operators may for instance be differentiated by their respective Mobile Network Codes (MNC). In other words, two communication networks may be considered to be operated by different operators if they have different MNCs.

According to the first and second aspects of the invention, both information on a serving cell that is, at a point of time, serving a mobile terminal and information related to a neighbor cell that is, at least substantially at the point of time, observed by the mobile terminal, is provided or obtained. Therein, the expression "at least substantially at the point of time" is understood to comprise the case of "at the point of time" as one extreme. The expression "at least substantially at the point of time" may for instance be understood as explained in the following: Since the information on the serving cell and the information related to a neighbor cell may for instance be provided/obtained in a fingerprint together with a position estimate for the mobile terminal or be provided/obtained in order to determine a position estimate for the mobile terminal, it may be important to ensure that both the information on the serving cell and the information related to a neighbor cell refer to the same point of time or refer to respective points of time within an interval of time with only limited duration. If the time interval grows too large, the accuracy of the PRI to be generated (see system 1a of FIG. 1a) or of the position estimate to be determined (see systems 1b or 1c of FIG. 1b or 1c, respectively) may significantly degrade, in particular if the mobile terminal is moving at high speed. In contrast, if the mobile terminal is immobile or moving at low (e.g. pedestrian) speed, a longer time interval may be allowed (e.g. 25 s assuming a pedestrian speed of 6 km/h and a desired positioning accuracy of less than 40 m, or e.g. 1 s for vehicular speeds). To encompass all scenarios, it may for instance be advisable to require the time interval to be less than 0.1, 0.5, 1, 5, 10, 50 or 100 seconds. This may allow performing the steps for determining the information on a serving cell and the information related to a neighbor cell sequentially, i.e. after each other, although they may of course also be performed in parallel.

According to the first and second aspects of the invention, the neighbor cell is a neighbor cell of a set of one or more neighbor cells specified in a list of neighbor cells, wherein the list is associated with the serving cell, and wherein information related to a neighbor cell is only provided if the neighbor cell is specified in the list of neighbor cells and is observed by the mobile terminal at least substantially at the point of time when the mobile terminal is served by the serving cell. This list of neighbor cells may for instance be provided to the mobile terminal as assistance information, as shown in FIGS. 1a and 1b. The list may for instance be provided to the mobile terminal in a scenario where both the first communication network and the second communication network are operated by the same operator. The list may then for instance be primarily provided to enable the mobile terminal to monitor candidate cells for an inter-system handover between the first communication system and the second communication system, but may equally well be used to reduce the amount of information on neighbor cells that is to be determined by the mobile terminal and, if the mobile terminal is a collector terminal (see mobile terminal 2a of FIG. 1a) or does not determine the position estimate itself, to be provided to another entity (e.g. PRI generation/updating server 4 of FIG. 1a or positioning server 5 of FIG. 1b).

According to the first and second aspects of the invention, the exemplary methods according to these aspects may further comprise providing (first aspect) or obtaining (second aspect) information related to a further neighbor cell that is, at least substantially at the point of time, observed by the mobile terminal, wherein the further neighbor cell is a cell of a third communication network, wherein the first communication network has a type that is different from a type of the third communication network and/or is operated by an operator that is different from an operator of the third communication network, and wherein the second communication network has a type that is different from a type of the third communication network and/or is operated by an operator that is different from an operator of the third communication network. Thus at least information related to two neighbor cells of respective communication networks that are of different type or operated by different operators are provided/obtained, further improving the accuracy of the positioning process (either concerning the accuracy of the PRI or of the position estimate itself).

Similarly, according to the third, fourth and fifth aspects of the invention, the exemplary methods according to these aspects may further comprise storing (third aspect), providing (fourth aspect) or obtaining (fifth aspect) PRI for a further neighbor cell that is observable by the mobile terminal when the mobile terminal is positioned at the first position and served by the serving cell, wherein the further neighbor cell is a cell of a third communication network, wherein the first communication network has a type that is different from a type of the third communication network and/or is operated by an operator that is different from an operator of the third communication network, and wherein the second communication network has a type that is different from a type of the third communication network and/or is operated by an operator that is different from an operator of the third communication network.

According to the first aspect of the invention, the exemplary method according to this aspect (see FIG. 2) may further comprise determining the information on the serving cell and the information related to the neighbor cell.

According to the first aspect of the invention, the exemplary method according to this aspect (see FIG. 2) may further comprise determining or obtaining a position estimate for the mobile terminal, and providing the position estimate together with the information on the serving cell and the information related to the neighbor cell. The position estimate may for instance be determined by a GNSS unit of the apparatus that performs the exemplary method according to the first aspect, or may be received by the apparatus from another unit, e.g. a unit internal to mobile terminal 2a of FIG. 1a.

According to the first aspect of the invention, the exemplary method according to this aspect (see FIG. 2) may further comprise determining or obtaining a position estimate for the mobile terminal, the position estimate determined at least based on PRI for the serving cell and PRI for the neighbor cell, the PRI for the serving cell retrieved at least based on the provided information on the serving cell, and the PRI for the neighbor cell retrieved at least based on the provided information on the serving cell and the provided information related to the neighbor cell. The obtaining of the position estimate may for instance be performed by mobile terminal 2b of FIG. 1b (with the PRI being retrieved at PRI database 6 by positioning server 5), whereas the determining of the position estimate may for instance be performed by mobile terminal 2c of FIG. 1c (with the PRI being retrieved from a database internal to mobile terminal 2c).

According to the second aspect of the invention, the exemplary method according to this aspect (see FIG. 3) may further comprise determining a position estimate for the mobile terminal, the position estimate determined at least based on PRI for the serving cell and PRI for the neighbor cell, the PRI for the serving cell retrieved at least based on the obtained information on the serving cell, and the PRI for the neighbor cell retrieved at least based on the obtained information on the serving cell and the provided information related to the neighbor cell. The determining of the position estimate may for instance be performed by positioning server 5 of FIG. 1b.

The determined position estimate may then be provided to the mobile terminal (e.g. mobile terminal 2b of FIG. 1c).

According to the second aspect of the invention, the exemplary method according to this aspect (see FIG. 3) may further comprise obtaining a position estimate for the mobile terminal, the position estimate associated with the information on the serving cell and the information related to the neighbor cell, using at least the obtained position estimate and the obtained information on the serving cell to generate or update PRI for the serving cell, and using at least the obtained position estimate, the obtained information on the serving cell and the obtained information related to the neighbor cell to generate or update PRI for the neighbor cell.

This may for instance be performed by PRI generation/updating server 4 of FIG. 1a. Therein, generation/updating of PRI for the serving cell may for instance be possible only based on the obtained position estimate and the obtained information on the serving cell, since the information on the serving cell comprises a globally unique identifier of the serving cell, whereas generation/updating of PRI for the neighbor cell may require, besides the obtained position estimate, both the obtained information on the serving cell and the information related to the neighbor cell, since the information related to the neighbor cell may not be globally unique and thus may have to be interpreted together with the information on the serving cell that may comprise a globally unique identifier of the serving cell. As described above, the PRI for the neighbor cell may for instance be handled in a database that stores the respective PRI for a plurality of cells in a dependency relationship with respect to the serving cell, e.g. as a child or subordinated object to the object representing the serving cell.

Similarly, according to the third, fourth and fifth aspects of the invention, the PRI for the serving cell may be retrievable based on information on the serving cell, and wherein the PRI for the neighbor cell is retrievable at least based on the information on the serving cell and information related to the neighbor cell.

Furthermore, with respect to all five aspects of the present invention and their further optional feature described above, the following is disclosed:

A computer program code, the computer program code when executed by a processor causing an apparatus to perform any of the example embodiments of methods according to the first to fifth aspects of the invention and their further optional features described above. The computer program code may for instance be stored in a computer readable storage medium. Therein, if a method comprises several methods steps, the computer program code may for instance comprise respective instructions for each of these steps.

An apparatus configured to realize or comprising respective means for realizing any of the example embodiments of methods according to the first to fifth aspects of the invention and their further optional features described above. Therein, if a method comprises several methods steps, there shall be respective means for each of these steps.

An apparatus comprising at least one processor and at least one memory including computer program code, the at least one memory and the computer program code configured to, with the at least one processor, cause an apparatus at least to perform any of the example embodiments of methods according to the first to fifth aspects of the invention and their further optional features described above.

Figure 7:
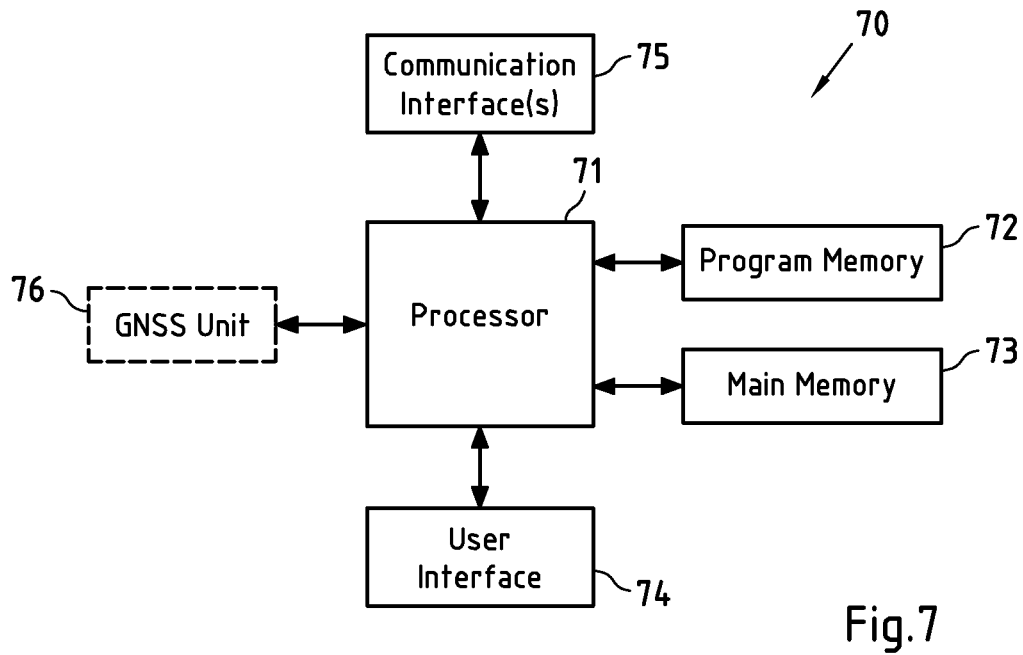
FIGS. 7-8 are block diagrams of example embodiments of apparatuses according to the present invention.

FIG. 7 is a schematic block diagram of an example embodiment of an apparatus 70 according to the invention. This apparatus may represent or at least form a part (e.g. as a module) of a mobile terminal, e.g. the mobile terminal 1a of FIG. 1a, the mobile terminal 1b of FIG. 1b or the mobile terminal 1c of FIG. 1c.

Apparatus 70 comprises a processor 71. Processor 71 may represent a single processor or two or more processors, which are for instance at least partially coupled, for instance via a bus. Processor 71 executes a program code stored in program memory 72. This program code may for instance cause apparatus 70 to perform any one of the example embodiments of methods according to the first, third and fifth aspect of the invention (see the flowcharts of FIGS. 2, 4 and 6), when executed on processor 71. Processor 71 further interfaces with a main memory 73.

Some or all of memories 72 and 73 may also be included into processor 20. One of or both of memories 72 and 73 may be fixedly connected to processor 71 or at least partially removable from processor 71, for instance in the form of a memory card or stick. Program memory 72 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 72 may also comprise an operating system for processor 71. Program memory 72 may for instance comprise a first memory portion that is fixedly installed in apparatus 70, and a second memory portion that is removable from apparatus 70, for instance in the form of a removable SD memory card. One or more sets of PRI that are useable by apparatus 70 to determine positions may for instance be stored in program memory 72. Main memory 73 may for instance be a volatile memory. It may for instance be a RAM or DRAM memory, to give but a few non-limiting examples. It may for instance be used as a working memory for processor 71 when executing an operating system and/or programs.

Processor 71 further controls a communication interface 75 configured to receive and/or output information. For instance, communication interface 75 may be configured to receive signals from nodes 4-1, 4-2 and 4-3 of system 1a, 1b or 1c of FIGS. 1a, 1b and 1c, respectively. Communication interface 75 may further be configured to transmit information to PRI generation/updating server 4 of system 1a (see FIG. 1a), to exchange information with positioning server 5 of system 1b (see FIG. 1b) or to exchange information with PRI server 7 of system 1c (see FIG. 1c), e.g. depending on whether apparatus 70 represents or forms part of mobile terminal 2a, 2b or 2c, respectively. This communication may for instance be based on a wireless connection. Communication interface 75 may thus for instance comprise circuitry such as modulators, filters, mixers, switches and/or one or more antennas to allow transmission and/or reception of signals. In embodiments of the invention, communication interface 75 is configured to allow communication according to a 2G/3G/4G cellular communication network and for instance also a non-cellular communication network, such as for instance a WLAN network. Nevertheless, the communication route between mobile terminal 2a/2b/2c and servers 4/5/7 may equally well at least partially comprise wire-bound portions. For instance, servers 4/5/7 may be connected to a back-bone of a wireless communication network (associated with mobile terminal 2a/2b/2c) via a wire-bound network such as for instance the internet. Communication interface 75 may for instance include a cellular modem that is capable of performing at least some of the measurements required to determine an LCI for a neighbor cell. Furthermore, communication interface 75 may be configured to provide this information to processor 71 to enable processor 71 to use this information for positioning purposes (e.g. to enable processor 71 to provide this information in a fingerprint to another entity or to provide this information as information related to a neighbor cell to a positioning server, or to use this information for terminal-based positioning).

Processor 71 further controls a user interface 74 configured to present information to a user of apparatus 70 and/or to receive information from such a user. Such information may for instance comprise information on a position estimate determined by positioning based on PRI. User interface 74 may for instance be the standard user interface via which a user of apparatus 70 interacts with apparatus 70 to control other functionality thereof, such as making phone calls, browsing the Internet, etc.

Processor 71 may further control an optional GNSS interface 76 (given in dashed lines in FIG. 7) configured to receive positioning information of a GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case apparatus 70 has a GNSS interface 76, the user of apparatus 70 or for instance the mobile terminal comprising apparatus 70 can still benefit from using the above-described PRI-based positioning technologies, since these technologies may allow for significantly reduced time-to-first-fix and/or lower power consumption as compared to GNSS-based positioning. Also, not all applications on a mobile terminal may require highly accurate GNSS-based position estimates. For instance, for a local weather application, it may be sufficient to use PRI-based position estimates. Also, and perhaps even more important, PRI-based positioning technologies work indoors, which is generally a challenging environment for GNSS-based technologies.

The components 72-76 of apparatus 70 may for instance be connected with processor 71 by means of one or more serial and/or parallel busses.

Figure 8:
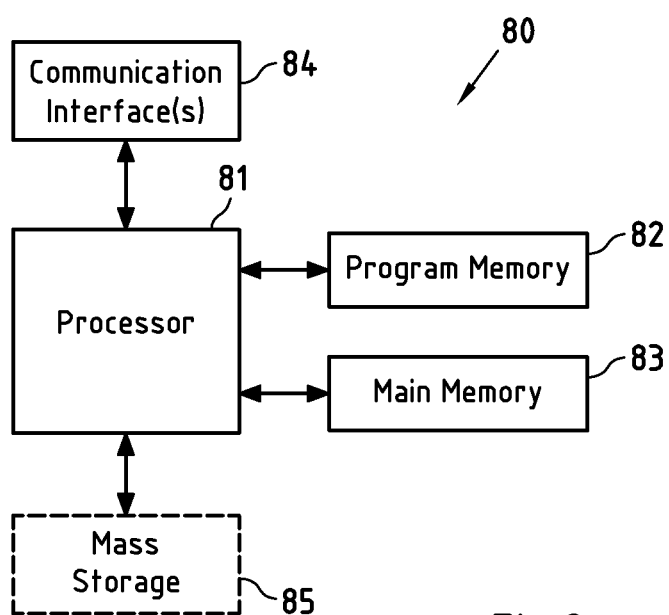

FIG. 8 is a schematic block diagram of an example embodiment of an apparatus 80 according to the invention. This apparatus may represents or at least forms a part (e.g. as a module) of a server, e.g. the PRI generation/updating server 4 of FIG. 1a, the positioning server 5 of FIG. 1b or the PRI server 7 of FIG. 1c.

Apparatus 80 comprises a processor 81. Processor 81 may represent a single processor or two or more processors, which are for instance at least partially coupled, for instance via a bus. Processor 81 executes a program code stored in program memory 82. This program code may for instance cause apparatus 80 to perform any one of the example embodiments of methods according to the second, third, fourth and fifth aspect of the invention (see the flowcharts of FIGS. 3, 4, 5 and 6) or combinations thereof, when executed on processor 81.

Processor 81 further interfaces with a main memory 83 (for instance acting as a working memory) and optionally with a mass storage 85, which may for instance store a plurality of different sets of PRI. Such a mass storage may for instance be present if apparatus 80 embodies the PRI server 7 of FIG. 1c.

Memories 82 and 83 may have the same or a similar configuration and relationship with processor 81 as already described for memories 72 and 73 of apparatus 70 above. Mass storage 85 may for instance be embodied as mass storage device, for instance with capacities of several Gigabytes or several Terabytes. It may either be fixedly connected to processor 81, or may be releasably connectable thereto. Non-limiting examples of mass storage 85 are a direct-attached storage (DAS), a storage area network (SAN) or a Network-attached storage (NAS).

Processor 81 further controls a communication interface 84 configured to receive and/or output information. For instance, communication interface 84 may be configured to exchange information with mobile terminal 2a/2b/2c of system 1a/1b/1c (see FIGS. 1a/1b/1c). This may for instance comprise receiving fingerprints from mobile terminal 2a or information on serving cells and information related to one or more neighbor cells from mobile terminal 2b or a request for PRI from mobile terminal 2c, and providing a position estimate to mobile terminal 2b, assistance information to mobile terminal 2a or 2b or a set of PRI to mobile terminal 2c. This communication may for instance be based on a wireless connection. Communication interface 84 may thus for instance comprise circuitry such as modulators, filters, mixers, switches and/or one or more antennas to allow transmission and/or reception of signals. In embodiments of the invention, communication interface 84 is configured to allow communication according to a 2G/3G/4G cellular communication network and optionally also a non-cellular communication network. Equally well, communication interface 84 may be a wire-bound network interface. It may for instance allow apparatus 80 to communicate with a network such as the internet. The communication channel between apparatus 80 (e.g. server 4/5/7) and mobile terminal 2a/2b/2c may then for instance comprise both wire-bound and wireless portions. The wire-bound portion may for instance connect communication interface 84 with a backbone of a wireless communication network, and the wireless portion may connect the wireless communication network with mobile terminal 2a/2b/2c. Furthermore, communication interface 84 may be configured to exchange information with PRI database 6 of FIG. 1b. This exchange may for instance be performed via a wire-bound network such as for instance the internet.

The components 82-85 of apparatus 80 may for instance be connected with processor 81 by means of one or more serial and/or parallel busses.

Program memories 72 of FIG. 7 and 82 of FIG. 8 may be considered as tangible storage media, which may in particular be non-transitory storage media. They may comprise respective programs, which in turn comprise respective program code (for instance a set of instructions).

It is to be noted that the circuitry formed by the components of apparatuses 70 and 80 may be implemented in hardware alone, partially in hardware and in software, or in software only.

As used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this specification, in particular but not limited to processors 71 and 81 of FIGS. 7 and 8, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Figure 9:
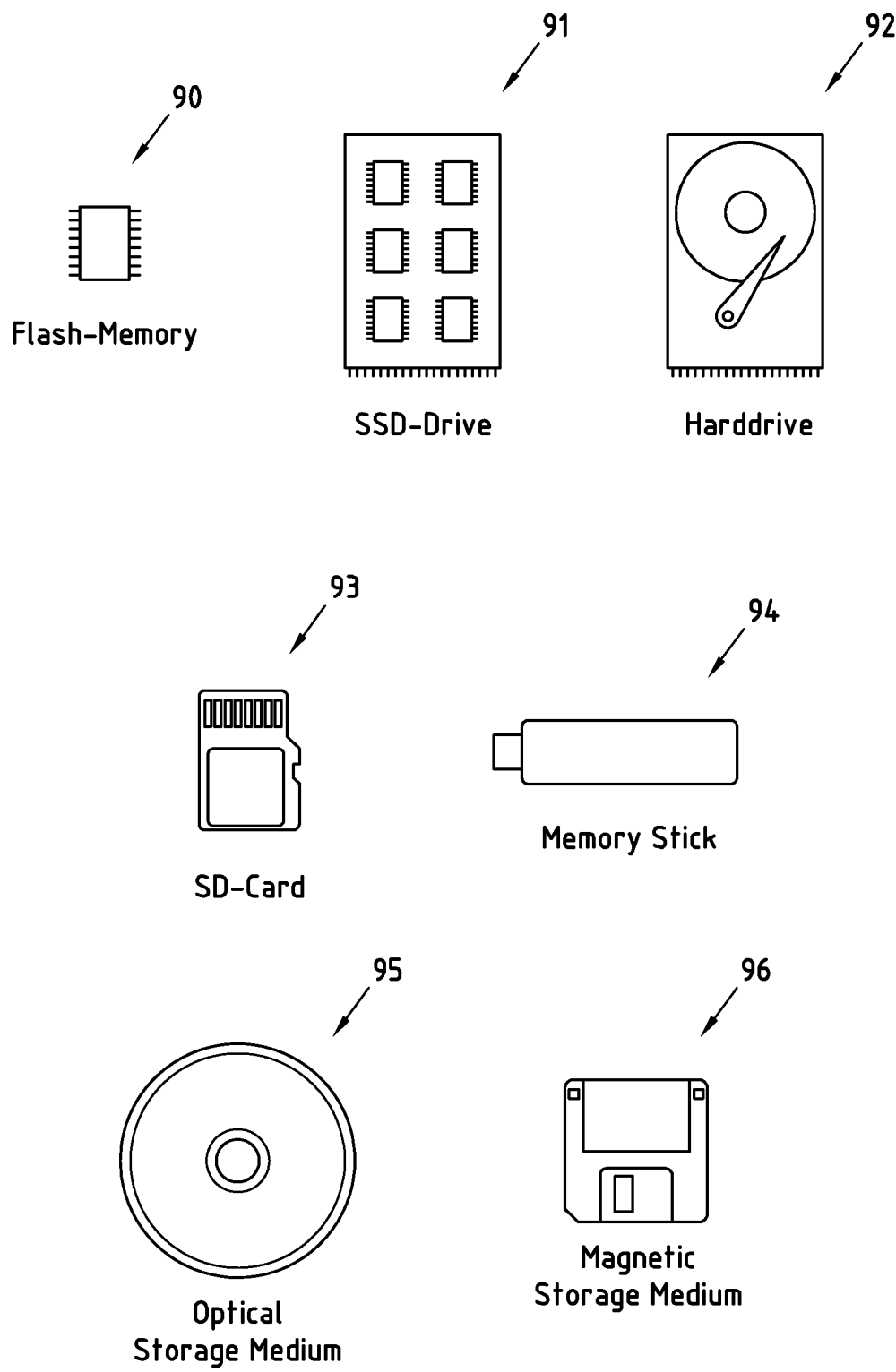
FIG. 9 a schematic illustration of example embodiments of tangible storage media according to the present invention.

FIG. 9 illustrates examples of tangible storage media that may for instance be used to implement program memory 72 of FIG. 7 and/or program memory 82 of FIG. 8. To this end, FIG. 9 displays a flash memory 90, which may for instance be soldered or bonded to a printed circuit board, a solid-state drive 91 comprising a plurality of memory chips (e.g. Flash memory chips), a magnetic hard drive 92, a Secure Digital (SD) card 93, a Universal Serial Bus (USB) memory stick 94, an optical storage medium 95 (such as for instance a CD-ROM or DVD) and a magnetic storage medium 96.

The example storage media of FIG. 9 may equally well represent examples of an apparatus configured to store (or comprising means for storing) positioning-related information for a serving cell and positioning-related information for a neighbor cell. Further non-limiting examples of such an apparatus are a storage area network (SAN) or a direct-attached-storage (DAS).

In the following, specific examples on the measurements performed by the mobile terminals 2a/2b/2c of FIGS. 1a/1b/1c as a basis for the provision of fingerprints (see system 1a of FIG. 1a) or as a basis for the PRI-based positioning (see systems 1b/1c of FIGS. 1b/1c) will be given. These examples also show what kind of information on the serving cell and information on the one or more neighbor cells is provided by the mobile terminals 2a/2b and obtained by the server 4 and 5 of FIGS. 1a and 1b.

Exemplary cellular network measurements to be performed by a mobile terminal (such as mobile terminal 2b of FIG. 1b) in the context of the LTE Positioning Protocol (LPP) are specified in document 3GPP TS 36.355 V 11.3.0 and OMA LPP Extensions Specification Candidate Version 1.0). Such measurements typically have the following structure (here a WCDMA measurement is considered as an example):

| | | Serving cell |
|---|---|---|
| MCC | | |
| MNC | | |
| UCID | | |
| Network Measurement Report | Frequency info (repeats once per frequency) | |
| | 1UARFCN-DL | |
| | UARFCN-UL [optional] | |
| | Carrier RSSI [optional] | |
| | Repeats once per cell | Intra-Frequency cell info |
| | | P-CPICH |
| | | UCID [optional] |
| | | RSCP [optional] |
| | | EcN0 [optional] |
| | | Pathloss [optional] |

Therein, in addition to the abbreviations introduced already above, the following abbreviations are used:
RSSI=Received Signal Strength Index
RSCP=Received Signal Code Power
EcN0=chip power The structure is such that in addition to the serving cell, the report allows reporting observed cells on multiple frequencies (UARFCN-DL), and on each frequency, multiple cells identified by at least their Primary Control Pilot Channel Scrambling Code (P-CPICH). Note that in WCDMA network there may be multiple cells on the same frequency, and they are distinguished from each other by their CDMA spread spectrum codes (P-CPICH). It is worth noting that in this structure the radio measurements for the serving cell are carried in the network measurement report.

As an example where measurements are performed for a serving cell and one neighbor cell of the same communication network, assume that there are two cells of the same communication network having the following characteristics:
MCC=244, MNC=1 for both cells
UCIDs are 1 and 2 for the two cells, respectively
Both cells are on UARFCN-DL frequency 10837
P-CPICHs are 11 and 22 for cells with UCID=1 and UCID=2, respectively A cellular measurement taken at a location X1 where the cell with UCID=1 is the serving cell and the cell with UCID=2 is the neighbor cell therefore might look like

| | | Serving cell |
|---|---|---|
| MCC = 244 | | |
| MNC = 1 | | |
| UCID = 1 | | |
| Network measurement | | Frequency info |
| | UARFCN-DL = 10837 | |
| | UARFCN-UL = N/A | |
| | RSSI = N/A | |
| Intra-frequency cells | | Intra-Frequency cell info |
| | P-CPICH = 11 | |
| | UCID = 1 | |
| | RSCP = 54 | |
| | EcN0 = 33 | |
| | Pathloss = 106 | |
| | | Intra-Frequency cell info |
| | P-CPICH = 22 | |
| | UCID = N/A | |
| | RSCP = 32 | |
| | EcN0 = 8 | |
| | Pathloss = N/A | |

It can be seen that, for the serving cell, the global identification consisting of MCC, MNC and UCID is present in the measurement report. Furthermore, there are cell info sections in the report for both the serving cell (UCID=1) and the neighbor cell (UCID=2). As an aside, it should be noted that for the serving cell, a pathloss estimate is available, so that a radio channel model may be used in addition to a coverage area model to increase the accuracy of the positioning. Furthermore, the RSCP is also available. If the pathloss model comprises the estimated transmission power, then the RSCP can be used to estimate the pathloss according to this model as well.

Correspondingly, a cellular measurement taken at a location X2 where the cell with UCID=2 is the serving cell and the cell with UCID=1 is the neighbor cell might then look like

| | | Serving cell |
|---|---|---|
| MCC = 244 | | |
| MNC = 1 | | |
| UCID = 2 | | |
| Network measurement | | Frequency info |
| | UARFCN-DL = 10837 | |
| | UARFCN-UL = N/A | |
| | RSSI = N/A | |
| Intra-frequency cells | | Intra-Frequency cell info |
| | P-CPICH = 11 | |
| | UCID = N/A | |
| | RSCP = 28 | |
| | EcN0 = N/A | |
| | Pathloss = N/A | |
| | | Intra-Frequency cell info |
| | P-CPICH = 22 | |
| | UCID = 2 | |
| | RSCP = 60 | |
| | EcN0 = 46 | |
| | Pathloss = 102 | |

In this measurement, only the serving cell (UCID=2) is identified by its globally unique MCC-MNC-UCID and the other cell (a.k.a. true neighbor cell) is identified by its physical layer identities, UARFCN-DL+P-CPICH, i.e. by its LCI. This is the case because typically the cellular modem of the mobile terminal only decodes System Information Block from the serving cell (and not the neighbor cell), and consequently the GCI is known only for the serving cell. The cellular modem may for instance be implemented by communication interface 75 of the apparatus 70 of FIG. 7. Alternatively, it may be implemented by another component (not shown in FIG. 7) that interfaces with processor 71 of apparatus 70.

Embodiments of the present invention exploit that fact that, in addition to the current serving network (with its serving cell and neighbor cells as in the example above), there are obviously other communication networks available, too. These communication networks may use other air interface types (e.g. GSM, WCDMA, LTE, etc.) and have the same operator, or they may be communication networks of other operators.

For instance, it shall be assumed that a mobile terminal is currently associated with a GSM network with identifiers MCC=244 and MNC=5. The operator of this GSM network also has a WCDMA network. In addition, there are GSM and WCDMA networks for the operator MCC=244/MNC=91 in the same area.

In a rather simple implementation, the modem of the mobile terminal would only report the measurement information for the current serving network (i.e. the serving cell and potentially also neighbor cells of the same communication network, see above).

However, in case the operator has both GSM and WCDMA networks, the dual-mode (GSM+WCDMA) mobile terminal must continuously monitor also the cells of the other (currently non-serving) network, i.e. when the mobile terminal operates in the GSM network, its modem still monitors the WCDMA cells of the same operator in order to be ready for an inter-system handover. The modem gets information which cells (frequencies, etc.) to monitor from the current serving cell.

Thus, according to embodiments of the present invention, it is advantageous that the modem also exposes not only the measurements of the current serving network, but also the measurements made for the cells of the operator's other communication networks, so that these measurements can be used for positioning purposes (e.g. for determining PRI and/or for determining position estimates).

This example scenario is depicted in the following table, in which the serving network is WCDMA (MCC=244, MNC=1, UCID=1), and the operator's other network is a GSM network. The mobile terminal's modem gets the "GSM neighbor list" from the current serving cell (a WCDMA cell), e.g. in the form of assistance information as shown in FIGS. 1a and 1b, and based on that list, the modem knows to report (only) the correct GSM cells (the ones belonging to the current serving operator) in the measurement report.

| | | Serving network |
|---|---|---|
| MCC = 244 | | |
| MNC = 1 | | |
| UCID = 1 | | |
| Network measurement of the current serving network | UARFCN-DL = 10837 UARFCN-UL = N/A RSSI = N/A | Frequency info |
| | Intra-frequency cells | Intra-Frequency cell info |
| | P-CPICH = 11 UCID = 1 RSCP = 28 EcN0 = N/A Pathloss = N/A | |
| | P-CPICH = 22 UCID = N/A RSCP = 60 EcN0 = 46 Pathloss = N/A | Intra-Frequency cell info |
| Network measurement (GSM) of the serving MCC-MNC, i.e. of the same operator | BSIC = 11 ARFCN = 128 RxLevel = 34 | Cell info |
| | BSIC = 48 ARFCN = 837 RxLevel = 52 | Cell info |

Here, thus the MCC-MNC-UCID combination and the intra-frequency cell info for the cell with UDIC=1 would be an example for information on the serving cell (provided/obtained according to the first/second aspect of the invention), and the network measurements for the GSM network would be an example for information related to two neighbor cells.

As a further step, according to embodiments of the present invention, the modem can in principle also measure all the other cells too, i.e. the cells from other operators. However, in this scenario it is very likely that the mobile terminal's modem would just measure everything it can observe without decoding system information elements (comprising the globally unique identifiers) from these cells. This means that only the local cell ID will be available for those cells with the additional catch that these cells cannot be categorized based on the operators, because the operator information is not decoded from the signals (there's no need to do that from the perspective of the normal modem operations).

The following table depicts this kind of extra network measurements. It is to be noted that none of the cells here have a GCI available.

| Other networks | | |
|---|---|---|
| Extra WCDMA network measurement | UARFCN-DL = 10738 UARFCN-UL = N/A RSSI = N/A | Frequency info |
| | Intra-frequency cells | Intra-Frequency cell info |
| | P-CPICH = 111 UCID = N/A RSCP = 52 EcN0 = N/A Pathloss = N/A | |
| | P-CPICH = 222 UCID = N/A RSCP = 34 EcN0 = N/A Pathloss = N/A | Intra-Frequency cell info |
| | UARFCN-DL = 10924 UARFCN-UL = N/A RSSI = N/A | Frequency info |
| | Intra-frequency cells | Intra-Frequency cell info |
| | P-CPICH = 328 UCID = N/A RSCP = 28 EcN0 = N/A Pathloss = N/A | |
| | P-CPICH = 401 UCID = N/A RSCP = 60 EcN0 = 46 Pathloss = 102 | Intra-Frequency cell info |
| Extra GSM network measurement | BSIC = 18 ARFCN = 200 RxLevel = 34 | Cell info |
| | | Cell info |

```
BSIC = 48
ARFCN = 549
RxLevel = 52
```

It should be noted that, although the extra neighbor measurements are identified by their LCIs only, there will be no collisions, because the radio network plan over all the operators must be such that the same physical resources are not used by any two cells in the same area irrespective of the operator. I.e. there cannot be two GSM cells with the same ARFCN in the same area from two operators, because they would interfere with each other. This allows using these neighbor cells even without knowing to which network they belong (as long as they are modeled as children of some serving cell).

It should be noted that, an even more advanced mobile terminal may potentially be capable of identifying, in addition to the GCI of the serving node, also the GCI of one or more neighbor cells. In that case, it may not be necessary to provide the PRI for the neighbor cells as "child" data sets of the "parent" data sets of serving cells, because these GCI are globally unique. Nevertheless, identifying the GCIs of neighbor nodes may require receiving and decoding System Information Blocks also from the neighbor cells in addition to the serving cells, which is generally quite costly in terms of implementation, processing power and/or energy (e.g. high battery consumption). Furthermore, since the GCIs of the neighbor cells are basically useless for the normal operation of the mobile terminal, the current modems used in mobile terminals do not determine/provide the GCIs of neighbor cells. Consequently, exploiting the GCIs of both serving nodes and neighbor cells may require substantially changing the functionality of these modems, as compared to the above-described example embodiments of the present invention where advantageously only a locally unique identification (LCI) of neighbor nodes is required.

With respect to FIG. 10, now a further example for the consideration of neighbor cells of other network types and/or other operators for positioning purposes according to example embodiments of the present invention will be given.

Figure 10:
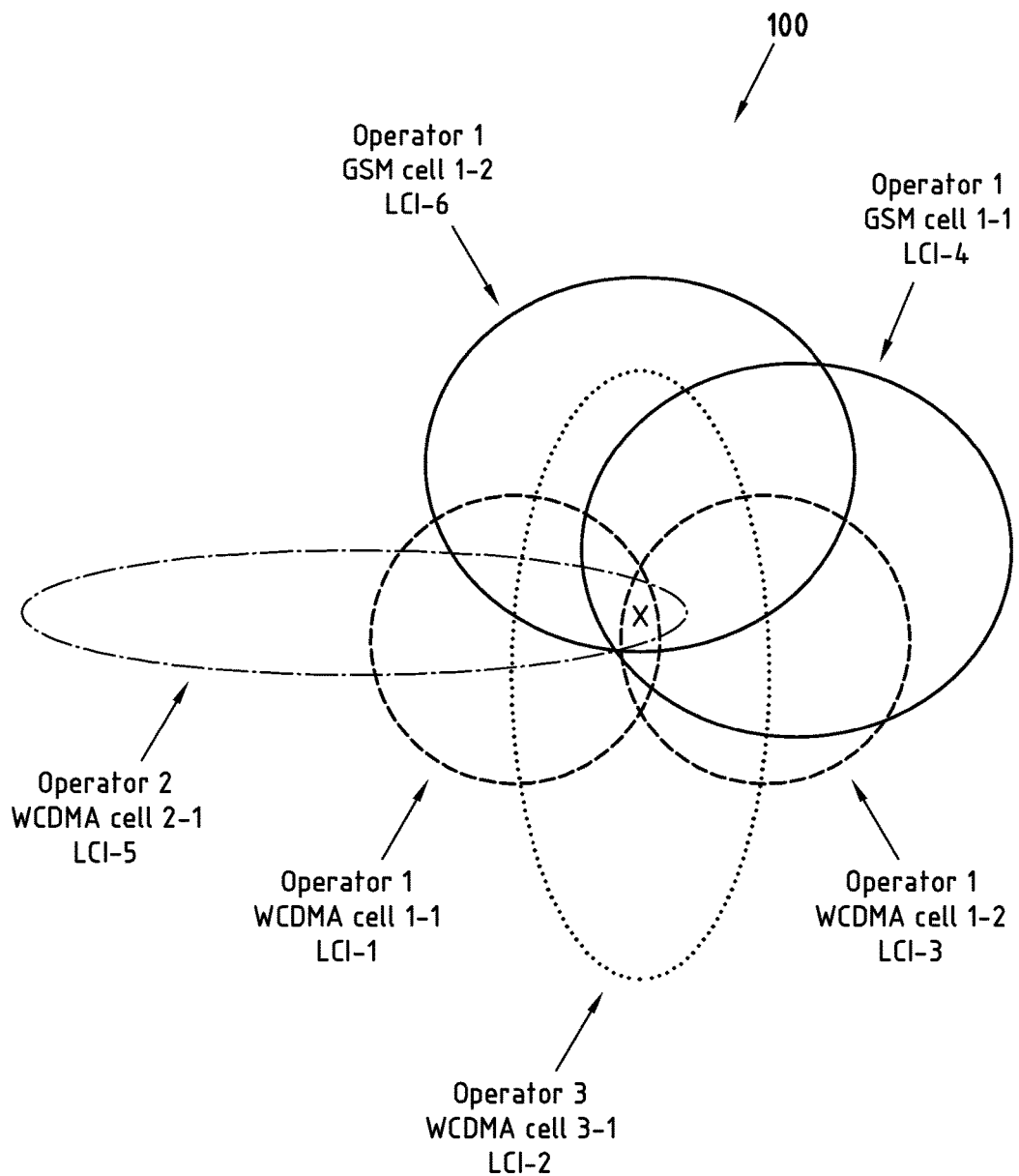
FIG. 10 is an example of a radio environment with coverage areas of six cells, based on which example embodiments of the present invention are explained.

FIG. 10 shows an exemplary radio environment with six cells from three different operators. Assume that the mobile terminal is located at the position marked with an "x", and that it's serving network is the WCDMA network of Operator 1 (cells in dashed lines). The serving cell is WCDMA cell 1-1.

In addition, Operator 1 has a GSM network (cells in solid lines). Furthermore, there are WCDMA cells from Operator 2 (dash-dotted lines) and Operator 3 (dotted lines).

Now a comparably simple arrangement of the cellular network measurements is that the mobile terminal measurement is as follows:
Serving cell:
Operator 1, WCDMA cell 1, LCI-1
Network Measurement:
LCI-3

I.e. only the serving cell and one neighbor cell of the same WCDMA communication network has been measured and reported for positioning purposes.

Now in case the device measures also the GSM cells of the same operator (based on the GSM Neighbor cell list from the WCDMA cell 1), as proposed by example embodiments of the present invention, the measurement becomes:
Serving cell:
Operator 1, WCDMA cell 1, LCI-1
Network Measurement:
LCI-3
GSM (same operator)
LCI-4
LCI-6

It is to be noted here that neighbor cells, both in WCDMA and GSM networks, are identified by their locally unique Local Cell IDs (LCI), because system information blocks are most typically only decoded from the current serving cell.

It is important to note that the mobile terminal's modem may certainly measure all the cells (from all the operators, etc.) with sufficiently high power to be detected at the mobile terminal. However, in the scenario described here, the mobile terminal's modem was able to filter from the set of all the detected GSM/WCDMA cells the ones corresponding to the current operator based on the neighbor cell list from the serving cell.

Even further, if the device measures, according to example embodiments of the present invention, all the cells it can observe, i.e. also those of other operators, the measurement becomes:
Serving cell:
Operator 1, WCDMA cell 1, LCI-1
Network Measurement:
LCI-3
GSM (same operator)
LCI-4
LCI-6
WCDMA (other operator)
LCI-2
LCI-5

Again, the additional neighbors are only known by their Local Cell IDs.

In this example, it can be readily seen how the consideration of a larger number of cells for the positioning contributes to the accuracy of the position estimate. For instance, it can be seen that consideration of the narrow-shaped coverage area ellipse with LCI-5 significantly contributes to reduce the size of the intersection of all six cells shown in FIG. 10. Thus without considering cell LCI-5, which is of another operator, the area of the intersection, which is representative of the area where the position estimate for the mobile terminal may lie, would be roughly twice as large.

Example embodiments of the present invention thus have the following impact on positioning systems:

From a fingerprinting perspective, which is schematically shown in FIG. 1a, if the mobile terminal's modem supports measurements from non-serving networks (other operators, other air interfaces), they are simply provided in the fingerprints to the server component responsible for the fingerprint processing, such as for instance PRI generation/updating server 4.

Figure 11A:
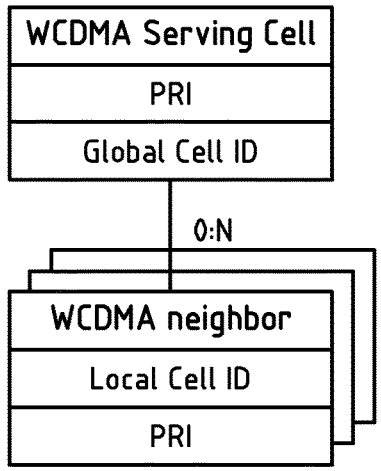
FIGS. 11a-11c are schematic illustrations of examples for storing positioning-related information for serving cells and neighbor cells

With respect to generation/updating of PRI (e.g. coverage area models, radio channel models etc.), which is also schematically shown in FIG. 1a and performed there in particular by PRI generation/updating server 4, FIG. 11a shows the conventional arrangement of the PRI used for positioning purposes. This example holds for a WCDMA cell for which there is a coverage area model for positioning purposes.

In FIG. 11a, there are, under the (WCDMA) serving cell, zero-to-multiple WCDMA neighbor cells belonging to the same operator, indicated by the notation 0:N, where N is an integer number. They all have PRI (e.g. a coverage area model) for positioning as well. These neighbor cells are modeled as children cells with respect to the serving cell, because they are only identified by their globally non-unique (local) cell IDs.

It is instructive to note that this structure already allows having in a PRI database (a.k.a. as a "radiomap") children cells that are from a different network. This is a novel approach according to example embodiments of the present invention and has not been pursued so far, because it has been thought that only the neighbor cells of the current network and operator should be included in the PRI database.

Figure 11B:
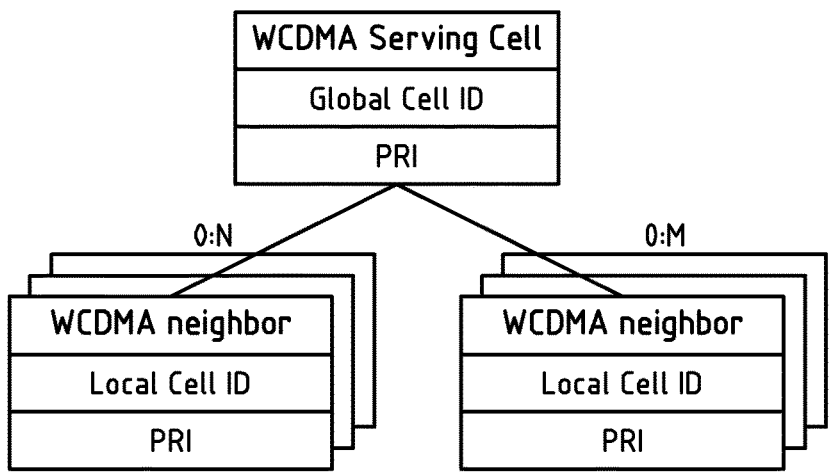

FIG. 11b shows an improved structure according to example embodiments of the present invention, which allows for having under a WCDMA serving cell not only WCDMA children (e.g. from 0 to N−1 WCDMA children), but also GSM children (e.g. from 0 to M−1 GSM children, where M is an integer number). This allows then utilizing the additional PRI of the GSM children in addition to the PRI of the serving cell and the WCDMA children as described above in the maximal manner.

Figure 11C:
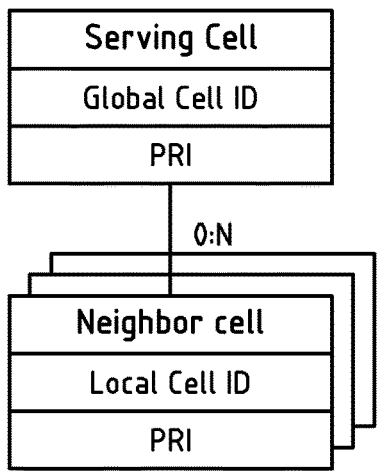

A more generalized database structure is shown in FIG. 11c with a serving cell, which has realizations for different air interfaces, and under the serving cell there are the neighbor cells as children cells (e.g. from 0 to N−1 children cells), which again have different realizations for the different air interfaces and/or operators.

With respect to positioning purposes, as explained in FIGS. 1b and 1c for the terminal-assisted mode and the terminal-based mode, respectively, the PRI is combined with the information/measurement provided by the mobile terminal. The example embodiments of the present invention will cause the PRI to have more "neighbor cells" than conventionally and in case the mobile terminal 2b of FIG. 1b requesting a position estimate supports only the serving network measurements, the mobile terminal will just use those neighbors. On the other hand, if the mobile terminal also supports non-serving network measurements, it can take advantage of all the neighbors in the PRI. This will significantly improve positioning performance.

Any presented connection in this specification is to be understood in a way that the involved components are operationally coupled. Thus, the connections can be direct or indirect with any number or combination of intervening elements, and there may be merely a functional relationship between the components.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category (method/apparatus/computer program) may also be used in a corresponding manner in an example embodiment of any other category. Finally, it should be understood that presence of a feature in the presented example embodiments shall not necessarily mean that this feature forms an essential feature of the invention and cannot be omitted or substituted.

Also the following example embodiments of the invention shall be considered to be disclosed:

EMBODIMENT 1

A method performed by an apparatus, the method comprising:
providing or obtaining
information on a serving cell that is, at a point of time, serving a mobile terminal and
information related to a neighbor cell that is, at least substantially at said point of time, observed by said mobile terminal,
wherein said serving cell is a cell of a first communication network, wherein said neighbor cell is a cell of a second communication network, and wherein said first communication network has a type that is different from a type of said second communication network and/or is operated by an operator that is different from an operator of said second communication network.

EMBODIMENT 2

The method according to embodiment 1, comprising said providing of said information on said serving cell and said information related to said neighbor cell, and further comprising:
determining said information on said serving cell and said information related to said neighbor cell.

EMBODIMENT 3

The method according to any of the embodiments 1-2, comprising said providing of said information on said serving cell and said information related to said neighbor cell, and further comprising:
determining or obtaining a position estimate for said mobile terminal, and
providing said position estimate together with said information on said serving cell and said information related to said neighbor cell.

EMBODIMENT 4

The method according to any of the embodiments 1-2, comprising said providing of said information on said serving cell and said information related to said neighbor cell, and further comprising:
determining or obtaining a position estimate for said mobile terminal, said position estimate determined at least based on positioning-related information for said serving cell and positioning-related information for said neighbor cell, said positioning-related information for said serving cell retrieved at least based on said provided information on said serving cell, and said positioning-related information for said neighbor cell retrieved at least based on said provided information on said serving cell and said provided information related to said neighbor cell.

EMBODIMENT 5

The method according to embodiment 1, comprising said obtaining of said information on said serving cell and said information related to said neighbor cell, and further comprising:

determining a position estimate for said mobile terminal, said position estimate determined at least based on positioning-related information for said serving cell and positioning-related information for said neighbor cell, said positioning-related information for said serving cell retrieved at least based on said obtained information on said serving cell, and said positioning-related information for said neighbor cell retrieved at least based on said obtained information on said serving cell and said provided information related to said neighbor cell.

EMBODIMENT 6

The method according to embodiment 5, further comprising:
providing said position estimate to said mobile terminal.

EMBODIMENT 7

The method according to embodiment 1, comprising said obtaining of said information on said serving cell and said information related to said neighbor cell, and further comprising:
obtaining a position estimate for said mobile terminal, said position estimate associated with said information on said serving cell and said information related to said neighbor cell,
using at least said obtained position estimate and said obtained information on said serving cell to generate or update positioning-related information for said serving cell, and
using at least said obtained position estimate, said obtained information on said serving cell and said obtained information related to said neighbor cell to generate or update positioning-related information for said neighbor cell.

EMBODIMENT 8

The method according to any of the embodiments 1-7, wherein said neighbor cell is a neighbor cell of a set of one or more neighbor cells specified in a list of neighbor cells, wherein said list is associated with said serving cell, and wherein information related to a neighbor cell is only provided if said neighbor cell is specified in said list of neighbor cells and is observed by said mobile terminal at least substantially at said point of time when said mobile terminal is served by said serving cell.

EMBODIMENT 9

The method according to any of the embodiments 1-8, further comprising:
providing or obtaining
information related to a further neighbor cell that is, at least substantially at said point of time, observed by said mobile terminal,
wherein said further neighbor cell is a cell of a third communication network, wherein said first communication network has a type that is different from a type of said third communication network and/or is operated by an operator that is different from an operator of said third communication network, and wherein said second communication network has a type that is different from a type of said third communication network and/or is operated by an operator that is different from an operator of said third communication network.

EMBODIMENT 10

A method performed by an apparatus, the method comprising:
storing, providing or obtaining
positioning-related information for a serving cell that is capable of serving a mobile terminal when said mobile terminal is positioned at a first position, and
positioning-related information for a neighbor cell that is observable by said mobile terminal when said mobile terminal is positioned at said first position and served by said serving cell,
wherein said serving cell is a cell of a first communication network, wherein said neighbor cell is a cell of a second communication network, and wherein said first communication network has a type that is different from a type of said second communication network and/or is operated by an operator that is different from an operator of said second communication network.

EMBODIMENT 11

The method according to embodiment 10, wherein said positioning-related information for said serving cell is retrievable based on information on the serving cell, and wherein said positioning-related information for said neighbor cell is retrievable at least based on said information on the serving cell and information related to the neighbor cell.

EMBODIMENT 12

The method according to any of the embodiments 10-11, further comprising:
storing, providing or obtaining
positioning-related information for a further neighbor cell that is observable by said mobile terminal when said mobile terminal is positioned at said first position and served by said serving cell,
wherein said further neighbor cell is a cell of a third communication network, wherein said first communication network has a type that is different from a type of said third communication network and/or is operated by an operator that is different from an operator of said third communication network, and wherein said second communication network has a type that is different from a type of said third communication network and/or is operated by an operator that is different from an operator of said third communication network.

EMBODIMENT 13

The method according to any of the embodiments 4-12, wherein said positioning-related information for said serving cell and said positioning-related information for said neighbor cell are stored in a database, and wherein said database reflects a dependency of said neighbor cell from said serving cell so that to retrieve said position-related information for said neighbor cell, at least the information on the serving cell and the information related to the neighbor cell is required.

EMBODIMENT 14

The method according to any of the embodiments 4-13, wherein said positioning-related information comprises at

EMBODIMENT 15

The method according to any of the embodiments 1-9 and 11-14, wherein said information on said serving cell comprises a cell identifier of said serving cell that is a globally unique cell identifier.

EMBODIMENT 16

The method according to any of the embodiments 1-9 and 11-15, wherein said information related to said neighbor cell constitutes a cell identifier that is not a globally unique cell identifier.

EMBODIMENT 17

The method according to embodiment 16, wherein said information related to said neighbor cell comprises information on one or more physical resources of said neighbor cell.

EMBODIMENT 18

The method according to embodiment 17, wherein said physical resources comprise one or more of frequency channels, timeslots, spreading codes, scrambling codes, spatial channels and polarization channels.

EMBODIMENT 19

The method according to any of the embodiments 1-18, wherein said type is an air interface type.

EMBODIMENT 20

The method according to any of the embodiments 1-19, wherein said first communication network is one of a Global System for Mobile Communications network or a derivate thereof, a Wideband Code Division Multiple Access network, a Time Division Synchronous Code Division Multiple Access network, a Long Term Evolution network or a Code Division Multiple Access network, and wherein said second communication network is one of a Global System for Mobile Communications network or a derivative thereof, a Wideband Code Division Multiple Access network, a Time Division Synchronous Code Division Multiple Access network, a Long Term Evolution network or a Code Division Multiple Access network.

EMBODIMENT 21

A computer program code, the computer program code when executed by a processor causing an apparatus to perform the method of any of embodiments 1-20.

EMBODIMENT 22

A computer readable storage medium in which computer program code according to embodiment 21 is stored.

EMBODIMENT 23

An apparatus configured to realize or comprising respective means for realizing the method of any of the embodiments 1-20.

EMBODIMENT 24

An apparatus comprising at least one processor and at least one memory including computer program code, the at least one memory and the computer program code configured to, with the at least one processor, cause an apparatus at least to perform the method of any of the embodiments 1-20.

The invention claimed is:

1. An apparatus comprising:
   at least one processor; and
   at least one memory including computer program code, said at least one memory and said computer program code configured to, with said at least one processor, cause said apparatus at least to perform:
   obtaining information on a serving cell that is, at a point of time, serving a mobile terminal;
   obtaining identification information related to one or more neighbor cells that are, at least substantially at said point of time, observed by said mobile terminal, wherein (a) the mobile terminal does not connect to the one or more neighbor cells and (b) said identification information is configured to locally identify the neighbor cell and comprises at least one of timeslots, spreading codes, spatial channels, or polarization channels related to a corresponding neighbor cell of the one or more neighbor cells; and
   updating position-related information for at least one of (a) the serving cell or (b) at least one of the one or more neighbor cells in a position-related information database accessible to the at least one processor, wherein accessing the position-related information corresponding to the at least one of the one or more neighbor cells requires at least a portion of the information on the serving cell,
   wherein said serving cell is a cell of a first communication network, wherein at least one of said one or more neighbor cells is a cell of a second communication network, wherein said first communication network has a type that is different from a type of said second communication network, and wherein said type comprises an air interface type defined by a standard of a standard-setting organization; wherein said first communication network is operated by an operator that is different from an operator of said second communication network.

2. The apparatus according to claim 1, wherein said at least one memory and said computer program code are configured to, with said at least one processor, cause said apparatus to perform:
   determining or obtaining a position estimate for said mobile terminal, and
   providing said position estimate together with said information on said serving cell and said information related to said neighbor cell.

3. The apparatus according to claim 1, wherein said at least one memory and said computer program code are configured to, with said at least one processor, cause said apparatus to perform:
   determining or obtaining a position estimate for said mobile terminal, said position estimate determined at least based on positioning-related information for said serving cell and positioning-related information for said neighbor cell, said positioning-related information for said serving cell retrieved at least based on said provided information on said serving cell, and said positioning-related information for said neighbor cell retrieved at least based on said provided information on said serving cell and said provided information related to said neighbor cell.

4. The apparatus according to claim 1, wherein said at least one memory and said computer program code are configured to, with said at least one processor, cause said apparatus to perform:
determining a position estimate for said mobile terminal, said position estimate determined at least based on positioning-related information for said serving cell and positioning-related information for said neighbor cell, said positioning-related information for said serving cell retrieved at least based on said obtained information on said serving cell, and said positioning-related information for said neighbor cell retrieved at least based on said obtained information on said serving cell and said provided information related to said neighbor cell, and
providing said position estimate to said mobile terminal.

5. The apparatus according to claim 1, wherein said at least one memory and said computer program code are configured to, with said at least one processor, cause said apparatus to perform:
obtaining a position estimate for said mobile terminal, said position estimate associated with said information on said serving cell and said information related to said neighbor cell,
using at least said obtained position estimate and said obtained information on said serving cell to one of generate and update positioning-related information for said serving cell, and
using at least said obtained position estimate, said obtained information on said serving cell and said obtained information related to said neighbor cell to one of generate and update positioning-related information for said neighbor cell.

6. The apparatus according to claim 1, wherein said neighbor cell is a neighbor cell of a set of one or more neighbor cells specified in a list of neighbor cells, wherein said list is associated with said serving cell, and wherein information related to a neighbor cell is only provided if said neighbor cell is specified in said list of neighbor cells and is observed by said mobile terminal at least substantially at said point of time when said mobile terminal is served by said serving cell.

7. The apparatus according to claim 3, wherein said positioning-related information for said serving cell and said positioning-related information for said neighbor cell are stored in a database, and wherein said database reflects a dependency of said neighbor cell from said serving cell so that to retrieve said position-related information for said neighbor cell, at least the information on the serving cell and the information related to the neighbor cell is required.

8. The apparatus according to claim 4, wherein said positioning-related information for said serving cell and said positioning-related information for said neighbor cell are stored in a database, and wherein said database reflects a dependency of said neighbor cell from said serving cell so that to retrieve said position-related information for said neighbor cell, at least the information on the serving cell and the information related to the neighbor cell is required.

9. The apparatus according to claim 1, wherein said information on said serving cell comprises a cell identifier of said serving cell that is a globally unique cell identifier.

10. The apparatus according to claim 1, wherein said information related to said neighbor cell constitutes a cell identifier that is not a globally unique cell identifier.

11. The apparatus according to claim 10, wherein said information related to said neighbor cell comprises information on one or more physical resources of said neighbor cell.

12. The apparatus according to claim 1, wherein said type is an air interface type defined by a standard of a standard-setting organization.

13. A method comprising:
obtaining information on a serving cell that is, at a point of time, serving a mobile terminal;
obtaining identification information related to one or more neighbor cells that are, at least substantially at said point of time, observed but not connected to by said mobile terminal, wherein said identification information is configured to locally identify the one or more neighbor cells and comprises at least one of timeslots, spreading codes, spatial channels, or polarization channels related to a corresponding neighbor cell of the one or more neighbor cells; and
updating position-related information for at least one of (a) the serving cell or (b) at least one of the one or more neighbor cells in a position-related information database, wherein accessing the position-related information corresponding to the at least one of the one or more neighbor cells requires at least a portion of the information on the serving cell,
wherein said serving cell is a cell of a first communication network, wherein at least one of said one or more neighbor cells is a cell of a second communication network, wherein said first communication network has a type that is different from a type of said second communication network, and wherein said type comprises an air interface type defined by a standard of a standard-setting organization; wherein the said communication network is operated by an operator that is different from an operator of said second communication network.

14. The method according to claim 13, wherein said neighbor cell is a neighbor cell of a set of one or more neighbor cells specified in a list of neighbor cells, wherein said list is associated with said serving cell, and wherein information related to a neighbor cell is only provided if said neighbor cell is specified in said list of neighbor cells and is observed by said mobile terminal at least substantially at said point of time when said mobile terminal is served by said serving cell.

15. An apparatus comprising:
at least one processor; and
at least one memory including computer program code, said at least one memory and said computer program code configured to, with said at least one processor, cause said apparatus at least to perform:
obtaining positioning-related information for a serving cell that is capable of serving a mobile terminal when said mobile terminal is positioned at a first position,
obtaining positioning-related information and resource information for one or more neighbor cells that are observable but not connected to by said mobile terminal when said mobile terminal is positioned at said first position and served by said serving cell, wherein said resource information comprises at least one of timeslots, spreading codes, spatial channels, or polarization channels related to a corresponding neighbor cell of the one or more neighbor cells, and updating position-related information for at least one of (a) the serving cell or (b) at least one of the one or more neighbor cells in a position-related information database accessible to the at least one processor, wherein accessing the position-related information corresponding to the at least one of the one or more neighbor cells requires at least a portion of the information on the serving cell, wherein said serving cell is a cell of a first communication network, wherein at least one of said neighbor cells is a cell of a second communication network, wherein said first communication network has a type that is different from a type of said second communication network, and wherein said type comprises an air interface type defined by a standard of a standard-setting organization; wherein the said communication network is operated by an operator that is different from an operator of said second communication network.

16. The apparatus according to claim 15, wherein said positioning-related information for said serving cell is retrievable based on information on the serving cell, and wherein said positioning-related information for said neighbor cell is retrievable at least based on said information on the serving cell and information related to the neighbor cell.

17. The apparatus according to claim 15, wherein said positioning-related information for said serving cell and said positioning-related information for said neighbor cell are stored in a database, and wherein said database reflects a dependency of said neighbor cell from said serving cell so that to retrieve said position-related information for said neighbor cell, at least the information on the serving cell and the information related to the neighbor cell is required.

18. The apparatus according to claim 15, wherein said information on said serving cell comprises a cell identifier of said serving cell that is a globally unique cell identifier.

19. The apparatus according to claim 15, wherein said information related to said neighbor cell constitutes a cell identifier that is not a globally unique cell identifier.

20. The apparatus according to claim 15, wherein said type is an air interface type defined by a standard of a standard-setting organization.

* * * * *